(12) United States Patent
Reed et al.

(10) Patent No.: US 6,235,831 B1
(45) Date of Patent: *May 22, 2001

(54) POLYMER COMPOSITIONS CONTAINING BROMINATED POLYSTYRENIC RESINS

(75) Inventors: Jon S. Reed; Susan D. Landry, both of Baton Rouge, LA (US); Daniel A. De Schryver, Bonheiden (BE); Billie B. Dadgar, Baton Rouge, LA (US); Donald E. Balhoff, Baton Rouge, LA (US); Charles H. Kolich, Baton Rouge, LA (US); Meng-Sheng Ao, Baton Rouge, LA (US); Homer C. Lin, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/151,110

(22) Filed: Sep. 10, 1998

Related U.S. Application Data (63) Continuation-in-part of application No. 08/852,462, filed on May 7, 1997, which is a continuation-in-part of application No. 08/727,341, filed on Sep. 26, 1996, now Pat. No. 5,677,390, and a continuation-in-part of application No. 08/872,985, filed on Jun. 11, 1997, now Pat. No. 5,852,132, which is a continuation of application No. 08/727,341.

(51) Int. Cl.$^7$ .................................................. C08L 47/00
(52) U.S. Cl. ........................................ 524/513; 525/177
(58) Field of Search .............................. 525/177; 524/513

(56) References Cited

U.S. PATENT DOCUMENTS

| | | | |
|---|---|---|---|
| 1,890,772 | 12/1932 | Dykstra ................................. | 260/93.5 |
| 2,199,026 | 4/1940 | Levine et al. ........................... | 260/74 |
| 2,823,201 | 2/1958 | Wheaton ............................... | 260/93.5 |
| 3,009,906 | 11/1961 | Eichhorn et al. ....................... | 260/93.5 |
| 3,039,977 | 6/1962 | Ingram .................................. | 260/2.5 |
| 3,050,476 | 8/1962 | Tress et al. ............................. | 260/2.5 |
| 3,132,045 | 5/1964 | Hill ....................................... | 117/138 |
| 3,474,067 | 10/1969 | Praetzel et al. ......................... | 260/41 |
| 3,506,741 | 4/1970 | Trepka et al. .......................... | 260/889 |
| 3,534,012 | 10/1970 | Dennis .................................. | 260/91.5 |
| 3,932,542 | 1/1976 | Gerns ................................... | 260/650 R |
| 3,959,398 | 5/1976 | Jalics .................................... | 260/650 R |
| 3,975,354 | 8/1976 | Buxbaum et al. ...................... | 260/40 R |
| 4,028,486 | 6/1977 | Jalics .................................... | 526/293 |
| 4,074,032 | 2/1978 | Naarmann et al. ..................... | 526/44 |
| 4,107,231 | 8/1978 | Wurmb et al. ......................... | 260/873 |
| 4,137,212 | 1/1979 | Theysohn et al. ...................... | 260/37 |
| 4,143,221 | 3/1979 | Naarmann et al. ..................... | 526/44 |
| 4,151,223 | 4/1979 | Neuberg et al. ........................ | 260/873 |
| 4,178,327 | 12/1979 | Hall et al. .............................. | 525/169 |
| 4,200,703 | 4/1980 | Diebel et al. ........................... | 525/357 |
| 4,352,909 | 10/1982 | Barda et al. ........................... | 525/157 |
| 4,360,455 | 11/1982 | Lindenschmidt et al. ............. | 252/609 |
| 4,389,517 | 6/1983 | Priddy et al. ........................... | 526/64 |
| 4,394,484 | 7/1983 | Jenkner et al. ......................... | 525/72 |
| 4,501,859 | 2/1985 | Newman et al. ....................... | 525/356 |
| 4,513,116 | 4/1985 | Kowalski et al. ....................... | 525/53 |

(List continued on next page.)

FOREIGN PATENT DOCUMENTS

| | | |
|---|---|---|
| 0020294 | 12/1980 | (EP) . |
| 0139931 | 5/1985 | (EP) . |
| 0201411 | 11/1986 | (EP) . |
| 0277429 | 8/1988 | (EP) . |
| 0 394 645 | 10/1990 | (EP) . |
| 0 763 567 | 3/1997 | (EP) . |
| 1589700 | 5/1981 | (GB) . |
| 61-034723 | 8/1986 | (JP) . |
| 63-150349 | 6/1988 | (JP) . |
| 2215807 | 8/1990 | (JP) . |
| 6-322022 | 11/1994 | (JP) . |
| 7-2930 | 1/1995 | (JP) . |
| 8-53511 | 2/1996 | (JP) . |
| 10-130325 | 5/1998 | (JP) . |
| 3020708 B2 | 3/2000 | (JP) . |
| 9503341 | 2/1995 | (WO) . |
| WO 98 50439 | 11/1998 | (WO) . |

OTHER PUBLICATIONS

Wenger, Richard M., "Glass Reinforced Flame Retardant Nylon–Improved Performance For Connector Applications", dated approximately 1984, 19 pages.

(List continued on next page.)

*Primary Examiner*—Bernard Lipman
(74) *Attorney, Agent, or Firm*—E. E. Spielman, Jr.

(57) ABSTRACT

A polyalkylene terephthalate polymer, such as polyethylene terephthalate, polybutylene terephthalate, blends or copolymers thereof, and analogous polyester-type engineering thermoplastics, with which has been blended a flame retardant amount of brominated styrenic polymer, such as brominated polystyrene, that, prior to blending, is characterized by (a) containing less than 700 ppm Cl and having a TGA temperature for 1% weight loss of 340° C. or higher; and/or (b) having an actual $M_w$ which is within about 20%, and preferably within about 10%, of its calculated theoretical $M_w$, the theoretical $M_w$ being based upon the actual bromine content of the brominated styrenic polymer and the $M_w$ of the styrenic polymer reactant used to produce the brominated styrenic polymer; and/or (c) being essentially free of each of the following impurities: (1) ethylene dichloride, (2) bromodichloroethane, (3) dibromochloroethane, (4) dibromodichloroethane, and (5) tribrormochloroethane. These compositions most preferably also further comprise a reinforcing amount of glass fiber and/or a flame retardant synergist dispersed therein. It is now possible to provide polyalkylene terephthalate compositions that have a UL-94 rating of V-O using both ¹⁄₁₆-inch test specimens and ¹⁄₃₂-inch test specimens, and that have superior electrical resistance characteristics as reflected by a higher comparative tracking index and greater melt stability as determined by capillary rheometry.

28 Claims, 1 Drawing Sheet

U.S. PATENT DOCUMENTS

| | | | |
|---|---|---|---|
| 4,548,995 | 10/1985 | Kowalski et al. | 525/354 |
| 4,554,326 | 11/1985 | Kowalski et al. | 525/354 |
| 4,636,554 | 1/1987 | Tada et al. | 525/359.3 |
| 4,650,832 | 3/1987 | Kowalski et al. | 525/354 |
| 4,748,286 | 5/1988 | Daren et al. | 570/200 |
| 4,832,873 | 5/1989 | Favstritsky et al. | 252/601 |
| 4,835,222 | 5/1989 | Sypniewski | 525/359.5 |
| 4,879,353 | 11/1989 | Sanders et al. | 525/357 |
| 4,975,496 | 12/1990 | Tigner et al. | 525/357 |
| 5,112,896 | 5/1992 | Dever et al. | 524/412 |
| 5,112,897 | 5/1992 | Dever et al. | 524/412 |
| 5,112,898 | 5/1992 | Dever et al. | 524/412 |
| 5,194,482 | 3/1993 | Chundury et al. | 524/412 |
| 5,235,000 | 8/1993 | McKinnie | 525/355 |
| 5,243,109 | 9/1993 | Kornberg et al. | 570/193 |
| 5,304,618 | 4/1994 | Atwell et al. | 526/293 |
| 5,326,837 | 7/1994 | Kissin | 526/150 |
| 5,328,983 | 7/1994 | Favstritsky et al. | 528/490 |
| 5,334,680 | 8/1994 | Mukai | 526/207 |
| 5,369,202 | 11/1994 | Atwell et al. | 526/293 |
| 5,532,322 | 7/1996 | Kadono et al. | 525/355 |
| 5,637,650 | 6/1997 | Gill et al. | 525/356 |
| 5,677,390 | 10/1997 | Dadgar et al. | 525/355 |
| 5,686,538 | 11/1997 | Balhoff et al. | 525/355 |
| 5,723,549 | 3/1998 | Dever et al. | 525/333.4 |
| 5,726,252 | 3/1998 | Gill et al. | 525/333.3 |
| 5,733,823 | 3/1998 | Sugioka et al. | 442/110 |
| 5,767,203 | 6/1998 | Ao et al. | 525/355 |
| 5,852,131 | 12/1998 | Balhoff et al. | 525/355 |
| 5,852,132 | 12/1998 | Dadgar et al. | 525/355 |
| 5,916,978 | 6/1999 | Ao et al. | 525/355 |
| B1 4,200,703 | 7/1987 | Diebel et al. | 525/340 |

OTHER PUBLICATIONS

Brochure from Ferro Corporation, Fire Retardant Chemical Association, Fall 1992 Conference, "Brominated Polystyrene Flame Retardant Additives", pp. 141–150.

McCabe et al., "Unit Operations of Chemical Engineering", McGraw–Hill Book Company, Third Edition, pp. 619–627.

Derwent Abstract of JP 8053511.

Patent Abstracts of Japan (European Patent Office)—Abstract of JP 051 70809, publication date of Jul. 1993 to Tosoh Corporation.

Brochure from Ferro Corporation, Product Information, Pyro–Chek 68PB & Pyro–Chek 60PB, Brominated Polystyrene Flame–Retardant Additives, 4 pages, Dated 1992.

JP 8176414 (Jul. 9, 1996)—Abstract No. 223551, XP002128364, Chemical Abstracts, Columbus, Ohio, vol. 125, No. 18, (Oct. 28, 1996).

JP 8283550 (Oct. 29, 1996)—Abstract, AN 1997–017575, XP002128367, Database WPI, Section Ch, Week 199702, Derwent Publications Ltd., London, GB.

JP 5287014 (Nov. 2, 1993)—Abstract No. 246108, XP002128365, Chemical Abstracts, Columbus, Ohio, vol. 120, No. 20, (May 16, 1994).

JP 2255755 (Oct. 16, 1990)—Abstract No. 186970, XP002128366, Chemical Abstracts, Columbus, Ohio, vol. 114, No. 20, (May 20, 1991).

POLYMER COMPOSITIONS CONTAINING BROMINATED POLYSTYRENIC RESINS

RELATED APPLICATIONS

This application is a continuation-in-part of commonly-owned application Ser. No. 08/852,462, filed May 7, 1997, and Ser. No. 08/872,985, filed Jun. 11, 1997, now U.S. Pat. No. 5,852,132. Ser. No. 08/852,462 in turn is a continuation-in-part of commonly-owned application Ser. No. 08/727,341, filed Sep. 26, 1996, now U.S. Pat. No. 5,677,390, issued Oct. 14, 1997. Ser. No. 08/872,985 in turn is a continuation of commonly-owned application Ser. No. 08/727,341, filed Sep. 26, 1996, now U.S. Pat. No. 5,677,390, issued Oct. 14, 1997.

BACKGROUND OF THE INVENTION

This invention relates to use of novel, high quality brominated styrenic polymers as flame retardants in thermoplastic formulations, and to novel and eminently useful thermoplastic polymer compositions with which such novel, high quality brominated styrenic polymers have been blended.

Brominated polystyrenes are well established as flame retardants for use in thermoplastics, e.g. polybutylene terephthalate, polyethylene terephthalate and nylon (a.k.a. polyamides). Recently, interest has been shown for expanding their use to syndiotactic polystyrene and polycyclohexylene dimethylene terephthalate. Generally, brominated polystyrenes are produced by a reaction between polystyrene and a brominating agent (e.g., bromine or bromine chloride) in the presence of a solvent (e.g., dichloroethane) and a Lewis acid catalyst. Within this broad context, the prior art has developed several processes which strive to obtain a low cost but high performing brominated polystyrene. Low cost is self-explanatory. Performance is predicted by a bromine content (60–67 wt % generally being preferred), a solution color ($\Delta E$=20–35) and a chlorine content (the maximum being 1.5 wt %). The process chosen to produce the brominated polystyrene will determine the particular structure of the brominated polystyrene produced and, thus, its qualities.

The bromine content of a brominated polystyrene is typically the sum of (1) the bromine which is substituted onto the aromatic portions of the polymer, (2) the bromine which is substituted onto aliphatic portions of the polymer, e.g., the polymer backbone or which is present due to alkylation of the aromatic portion of the polymer, and (3) any ionic bromine present, e.g., sodium bromide. The alkylation reaction is catalyzed by the Lewis acid catalyst and uses the reaction solvent (usually a 1–3 carbon atom dihaloalkane) as the alkylating agent. The bromine for (1) is referred to herein as aromatic bromide, while the bromine for (2) is referred to as aliphatic bromide. Even though ionic bromine can contribute to the bromine content, its contribution to the total bromine content is small.

The chlorine content is credited to chlorine which, like the bromine, is part of the polymer structure as an aromatic and/or aliphatic chloride. The use of bromine chloride as the brominating agent is the largest contributor to the chlorine content.

As a universal proposition, it is preferred that the brominated polystyrene have a minimized aliphatic bromide and/or aliphatic chloride, i.e., aliphatic halide, content. The presence of aliphatic halide in the polymer is not desirable as such aliphatic halide is not as thermally stable as the aromatic halide content, and, thus, the aliphatic halide can be easily converted to hydrogen halide, e.g., HBr or HCl, under normal end-use processing conditions. Hydrogen halide, in the presence of moisture, can cause severe corroding of metal process equipment. A brominated polystyrene having almost all aromatic bromide (ar-bromine) will have desirable flame retarding characteristics as the bromine will not leave the aromatic moiety at processing temperatures, but rather, will leave at the very high temperatures which are encountered in the vicinity of an approaching flame front.

Outside of whether or not the halide is present as an aromatic or aliphatic halide, it is also desirable to minimize the total chlorine content of the brominated polystyrene as chlorine is not as efficacious or as stable a flame retardant constituent as is bromine.

The desirability of obtaining a high aromatic bromine content along with a low aliphatic halide and total chlorine content is, unfortunately, not matched by the ability of prior art processes to produce same. Even though the art has proffered many processes which are claimed to produce a superior brominated polystyrene, none have actually been shown to deliver on their promise. See U.S. Pat. Nos. 4,200,703; 4,352,909; 4,975,496 and 5,532,322. A review of the Examples in these patents, which are reported to be actual experiments, shows that a high bromine content, say 68 wt % or above, is not obtained, much less that such could be obtained without a concomitant high aliphatic bromine content, say above 6000 ppm, based upon the total weight of the brominated polystyrene.

Further, the prior art brominated polystyrenes do not exhibit high thermal stability. Prior art polymers exhibit a 1% weight loss at temperatures less than 336° C. when submitted to Thermogravimetric Analysis (TGA) and, indeed, most exhibit a 1% weight loss at temperatures around 300° C. A low thermal stability is not desired when the brominated polystyrene is formulated with thermoplastic formulations which will be exposed to high processing temperatures.

Additionally, it has been demonstrated that prior art processes for the manufacture of brominated polystyrene give rise to significant cleavage or cross-linking of the polymer chain. This cleavage results in the produced brominated polystyrene having an $M_w$, as measured by Gel Permeation Chromatography, which is significantly lower than the calculated theoretical $M_w$ of the brominated polystyrene. The calculation is based upon the bromine content (wt %) of the brominated polystyrene product and the $M_w$ of the polystyrene reactant at reaction initiation. It is advantageous if the theoretical and actual $M_w$'s of the produced brominated polystyrene are close, given the±margins of error for GPC, since such closeness evidences a paucity of polymer cleavage. The degree of cleavage should be minimized since cleavage results in an increase of aliphatic end groups in the brominated polystyrene, which end groups provide loci for the facile formation of the undesirable hydrolyzable halides discussed above. Conversely, if cross-linking occurs, the molecular weight of the brominated polystyrene is increased, and if not controlled, such cross-linking can result in formation of insoluble residues and/or gelation of the reaction mixture. In addition, viscosity specifications related to end product usage can be disrupted by such undesirable increases in molecular weight.

It would be of considerable advantage if flame retarded polymer blends containing a more thermally stable brominated styrenic polymer, e.g., brominated polystyrene, and having superior electrical properties could be provided. For example, it would be of advantage if polyalkylene terephthalate compositions could be produced that have (A) a UL-94 rating of V-O using both 1/16-inch test specimens and 1/32-inch test specimens, (B) superior electrical resistance characteristics as reflected by a higher comparative tracking index, or (C) superior melt stability as determined by capillary rheometry, without material loss of other necessary and desirable physical and performance characteristics. It would be particularly advantageous if polyalkylene terephthalate compositions could be produced that have a combination of any two or, if possible, all three of (A) through (C) as just described.

Comparative tracking index (CTI) is a measure of the resistance of a material to the propagation of arcs (tracks) along its surface under wet conditions. CTI values considerably lower than that of the control formulation signify lower thermal stability and/or the presence of small amounts of volatile species in the additives, which in turn degrade the polyalkylene terephthalate, reducing molecular weight. These low molecular weight polymer chains can then volatilize and carbonize on the surface, resulting in surface tracking. High melt stability as reflected by capillary rheometry data is indicative of superior thermal stability of the overall polymer composition when used under actual service conditions.

SUMMARY OF THE INVENTION

Pursuant to one embodiment of this invention there is provided a composition which comprises a polyalkylene terephthalate polymer, such as polyethylene terephthalate, polybutylene terephthalate, polycyclohexylene dimethylene terephthalate, polytrimethylene terephthalate, blends or copolymers thereof, and analogous polyester-type engineering thermoplastics, having intimately mixed therein, a flame retardant amount of a brominated styrenic polymer, preferably brominated polystyrene, which, prior to mixing, contains less than about 700 ppm Cl and has a TGA temperature for 1% weight loss which is 340° C. or higher, preferably within the range of from about 340° C. to about 380° C., and more preferably within the range of from about 345° C. to about 380° C. It will be understood that in the context of this application the terms "mixed" and "mixing" correspond to the terms "blend" or "blending" which are often used in connection with bringing together a polymer and another substance such as an additive to form a uniform or substantially uniform mixture or blend of the two.

In another embodiment of this invention there is provided a composition which comprises a polyalkylene terephthalate polymer, such as polyethylene terephthalate, polybutylene terephthalate, polycyclohexylene dimethylene terephthalate, polytrimethylene terephthalate, blends or copolymers thereof, and analogous polyester-type engineering thermoplastics, having intimately mixed therein, a flame retardant amount of brominated styrenic polymer, preferably brominated polystyrene, that, prior to mixing, has an actual $M_w$ which is within about 20%, and preferably within about 10%, of its calculated theoretical $M_w$, the theoretical $M_w$ being based upon the actual bromine content of the brominated styrenic polymer and the $M_w$ of the styrenic polymer reactant used to produce the brominated styrenic polymer. Preferably, such brominated styrenic polymer is also characterized by containing, prior to mixing, less than about 700 ppm Cl and by having, prior to mixing, a TGA temperature for 1% weight loss which is 340° C. or higher, preferably within the range of from about 340° C. to about 380° C., and more preferably within the range of from about 345° C. to about 380° C.

Yet another embodiment of this invention is a composition which comprises a polyalkylene terephthalate polymer, such as polyethylene terephthalate, polybutylene terephthalate, polycyclohexylene dimethylene terephthalate, polytrimethylene terephthalate, polycyclohexylene dimethylene terephthalate, polytrimethylene terephthalate, blends or copolymers thereof, or analogous polyester-type engineering thermoplastics, having intimately mixed therein, a flame retardant amount of a brominated styrenic polymer, preferably brominated polystyrene, that, prior to mixing, is essentially free of impurities selected from the group consisting of ethylene dichloride, bromodichloroethane, dibromochloroethane, dibromodichloroethane, tribromochloroethane and any mixture of two or more of the foregoing. In alternative preferred embodiments such brominated styrenic polymer is also characterized (i) by containing, prior to mixing, less than about 700 ppm Cl and by having a TGA temperature for 1% weight loss which is 340° C. or higher, preferably within the range of from about 340° C. to about 380° C., and more preferably within the range of from about 345° C. to about 380° C., and/or (ii) by having, prior to mixing, an actual $M_w$ which is within about 20%, and preferably within about 10%, of its calculated theoretical $M_w$, the theoretical $M_w$ being based upon the actual bromine content of the brominated styrenic polymer and the $M_w$ of the styrenic polymer reactant used to produce the brominated styrenic polymer.

In a particularly preferred embodiment of this invention there is provided a composition which comprises a polyalkylene terephthalate polymer, such as polyethylene terephthalate, polybutylene terephthalate, polycyclohexylene dimethylene terephthalate, polytrimethylene terephthalate, blends or copolymers thereof, and analogous polyester-type engineering thermoplastics, having intimately mixed therein, a flame retardant amount of a brominated styrenic polymer, preferably brominated polystyrene, that, prior to mixing, is characterized by:

a) containing less than about 700 ppm Cl and having a TGA temperature for 1% weight loss which is 340° C. or higher, preferably within the range of from about 340° C. to about 380° C., and more preferably within the range of from about 345° C. to about 380° C.;

b) having an actual $M_w$ which is within about 20%, and preferably within about 10%, of its calculated theoretical $M_w$, the theoretical $M_w$ being based upon the actual bromine content of the brominated styrenic polymer and the $M_w$ of the styrenic polymer reactant used to produce the brominated styrenic polymer; and c) being essentially free of impurities selected from the group consisting of ethylene dichloride, bromodichloroethane, dibromochloroethane, dibromodichloroethane, tribromochloroethane and any mixture of two or more of the foregoing named impurities.

Each of the compositions of this invention described above most preferably also further comprises a reinforcing amount of glass fiber and/or a flame retardant synergist dispersed therein.

A feature of this invention is that it has now made it possible to provide polyalkylene terephthalate compositions that have a UL-94 rating of V-O using both 1/16-inch test specimens and 1/32-inch test specimens, and that have superior electrical resistance characteristics as reflected by a higher comparative tracking index. For example, this invention makes it possible to provide polybutylene terephthalate compositions that have a UL-94 rating of V-O using both 1/16-inch test specimens and 1/32-inch test specimens, and a comparative tracking index of at least about 240 volts at 50 drops, and indeed, a comparative tracking index of at least about 280 volts at 50 drops. Similarly, this invention has made it possible to provide polyethylene terephthalate compositions that have a UL-94 rating of V-O using both 1/16-inch test specimens and 1/32-inch test specimens, and a comparative tracking index of at least about 150 volts at 50 drops, and in fact a comparative tracking index of at least about 180 volts at 50 drops.

Likewise polyalkylene terephthalate compositions can now be provided that have a UL-94 rating of V-O using both 1/16-inch test specimens and 1/32-inch test specimens, and that have superior melt stability as reflected by capillary rheometry data taken at high temperatures. For example, it has been found possible to provide a polybutylene terephthalate composition that has in addition to these V-O ratings, a melt stability (as determined by capillary rheometry performed at a shear rate of 1075/sec at 250° C. in a Rosand twin bore capillary rheometer with capillary dimensions of L:8 mm and 0.25 mm D: 0.5 mm, and wherein shear viscosity measurements (typically but not necessarily in Pascal seconds; Pa.s) are taken on said composition at 0, 10, 20, and 30 minutes of residence time in the barrel of the capillary rheometer and plotted as a function of time) that provides a slope using linear regression that is within about 15 degrees of the slope derived in the same manner from a control composition that (i) is made from the same ingredients in the same proportions except that it is devoid of the brominated styrenic polymer, and (ii) is tested in the same way under the same test conditions. In fact, polyalkylene terephthalate compositions can now be provided that possess (i) the flame retardancy, (ii) superior comparative tracking indexes, and (iii) superior melt stability as shown by capillary rheometry data taken at high temperature. Moreover, it is now possible to achieve all of these superior characteristics without material loss of other necessary and desirable physical and performance characteristics.

Other embodiments and features of this invention will be further apparent from the ensuing description and appended claims.

FURTHER DETAILED DESCRIPTION

Brominated Styrenic Polymers

As noted above, the brominated styrenic polymers used in the practice of this invention are brominated styrenic polymers, (preferably a brominated polystyrene). These brominated styrenic polymers have very high thermal stability as is evidenced by the polymer having a TGA 1% weight loss at a temperature in excess of 340° C. and, preferably, within the range of from about 340° C. to about 380° C. and, most preferably, within the range of from about 345° C. to about 380° C. Most highly preferred is a brominated polystyrene with a TGA value at 1% weight loss which is within the range of from about 345° C. to 375° C. The high TGA temperatures which are characteristic of such polymers are not believed to be due to post reaction purification techniques. Rather, it is believed that the enhanced thermal stability is due to the chemical makeup of the brominated styrenic polymer itself.

This invention also provides polyalkylene terephthalate compositions having blended therewith a novel thermally stable brominated polystyrene which is comprised of polymer units having the formula:

wherein each X is independently —H or a halide atom, the identity of each X for each polymer unit being such that the brominated polystyrene contains less than about 6000 ppm of X-type halide atoms, and wherein the value of n for each polymer unit is such that the brominated polystyrene contains at least 68 wt % bromine. (All ppm values used herein are by weight and are based upon the total weight of the brominated polymer unless otherwise indicated.) From an economic and performance standpoint, it is preferred that the bromine content be within the range of from above 60 wt % to about 70–71 wt % (n=about 1.9 to about 2.9–3.0), and especially within the range of from about 68 wt % to about 71 wt % (n=about 2.7 to about 3.0).

With regard to the halide atoms, X, preferred brominated polystyrenes will be those in which X is bromide. Such polymers may contain some chlorine atoms, but the amount will be insignificant, say less than about 500 ppm, and where possible, less than about 100 ppm. If chlorine is present, its source would probably be the Lewis acid catalyst or the solvent used in the preparation of the brominated polystyrene. Preferred brominated polystyrene polymers are those in which the chlorine content is less than 500 ppm in accordance with X-Ray Fluorescence analysis. It is beneficial, from the viewpoint of economy and performance, that the X-type bromide content be less than about 4000 ppm, say within the range of from about 1000 ppm to about 3000 ppm. Most beneficial are those X-type bromide contents which are within the range of from 0 ppm to about 1500 ppm.

The brominated polystyrene component of the compositions of this invention are unique in that, from their very inception, the polymer has the very low X-type halide content discussed above. This is an important aspect as the polymers do not need further treatment to reduce the X-type halide content. Reduction of the X-type halide content, say by hydrolysis, is not desirable as it yields a polymer having hydroxyl, ether, and/or olefinic functionality in its structure which can alter polymer properties. It is preferred that the brominated polystyrene flame retardants used pursuant to this invention contain little or no hydrolysis residues, say less than about 500 ppm and preferably less than about 100 ppm.

The most preferred brominated polystyrene components of this invention will be those which provide, at the lowest cost, the highest bromine content and the lowest X-type halide content which obtain the desired performance in the polyalkylene terephthalate compositions of this invention.

This invention also provides polyalkylene terephthalate compositions with which has been blended a brominated styrenic polymer, preferably a brominated polystyrene, having an actual $M_w$ which is within about 20% of its calculated theoretical $M_w$, the theoretical $M_w$ being based upon the actual bromine content of the brominated styrenic polymer and the $M_w$ of the styrenic polymer reactant used to produce the brominated styrenic polymer. A difference between the actual $M_w$ and the theoretical $M_w$ outside of the normal±margin of error for GPC analysis, is evidence of either cross-linking (increases the $M_w$) or polymer chain cleavage (decreases the $M_w$). The 20% difference mentioned above for the brominated styrenic polymers used pursuant to this invention includes the±margin of error. Preferred differences are those less than about 20%, with differences of less than about 10% being most preferred. Since GPC techniques can give different but similar values for the same polymer tested, defining a brominated styrenic polymer as being suitable for use in the practice of this invention is best performed by taking the arithmetic average of five consecutive GPC determinations of the polymer to be tested. Other data averaging techniques are suitable, such as using the average of 10 consecutive GPC determinations with discard of the high and low values, the only requirement being that accurate and reproducible results are obtained.

The brominated styrenic polymers used in this invention preferably exhibit additional superior physical properties, e.g., little or no color or odor. For flame retardants, color is an important property, with pure white being the ultimate goal. Due to the formation of various color bodies by all bromination processes, the industry has accepted near-white products as being acceptable. The color of prior art brominated polystyrene, expressed as a solution ΔE value, generally will fall within the range of 20 to 35. In distinction, the brominated polystyrenes used pursuant to this invention typically feature ΔE values (10 wt % in chlorobenzene) of less than 20 and preferably within the range of from about 2 to about 18. Most preferably, such ΔE value will be within the range of from about 2 to about 15.

Another physical property of the preferred brominated styrenic polymers used in this invention is that they have essentially no odor, or very little odor, when heated to a temperature above 150° C. In comparison, Pyro-Chek® 68PB brominated polystyrene flame retardant (Ferro Corporation) has a noticeable and strong odor at 150° C. The strong odor is believed to be attributable to the presence of bromochloroethanes, e.g., bromodichloroethane, dibromochloroethane dibromodichloroethane and tribromochloroethane, which are in the Pyro-Chek® 68PB product. Such bromochloroethanes are not seen in detectable quantities in the brominated styrenic polymers used in forming the compositions of this invention.

Styrenic Polymer Reactants

Styrenic polymers which are brominated to form the brominated styrenic polymers used in the practice of this invention are homopolymers and copolymers of vinyl aromatic monomers. Preferred vinyl aromatic monomers have the formula:

$H_2C=CR-Ar$ wherein R is a hydrogen atom or an alkyl group having from 1 to 4 carbon atoms and Ar is an aromatic group (including alkyl-ring substituted aromatic groups) of from 6 to 10 carbon atoms. Examples of such monomers are styrene, alpha-methylstyrene, ortho-methylstyrene, meta-methylstyrene, para-methylstyrene, para-ethylstyrene, isopropenyltoluene, vinylnaphthalene, isopropenylnaphthalene, vinylbiphenyl, vinylanthracene, the dimethylstyrenes, tert-butylstyrene, the several bromostyrenes (such as the monobromo-, dibromo-, and tribromo- variants). Polystyrene is the preferred reactant. When the brominated styrenic polymer is made by bromination of a copolymer of two or more vinyl aromatic monomers, it is preferred that styrene be one of the monomers and that styrene comprise at least 50 weight percent of the copolymerizable vinyl aromatic monomers. If a bromo styrenic polymer is selected for bromination to make a brominated styrenic polymer, the initial bromostyrenic polymer must have a lower bromine content than the bromine content to be present in the brominated styrenic polymer to be used in the practice of this invention. In this connection, the terms "brominated styrenic polymer" and "brominated polystyrene" as used in the specification and in the claims hereof refer to a brominated polymer produced by bromination of a pre-existing styrenic polymer such as polystyrene or a copolymer of styrene and at least one other vinyl aromatic monomer, as distinguished from an oligomer or polymer produced by oligomerization or polymerization of one or more brominated styrenic monomers, the properties of the latter oligomers or polymers being considerably different from brominated polystyrene in a number of respects.

The polystyrene reactant used in the production of the brominated polystyrenes used pursuant to this invention can be any of those which are commercially available. Generally, the polystyrene backbone will not have been hydrogenated and, thus, will have unsaturation. There is no need for the brominated polymers used in the practice of this invention to be produced from anionically produced polystyrene as is taught in EPO 0 201 411; in fact, it is preferred that the polystyrene reactant not be an anionically produced polystyrene as such polystyrene polymers are expensive and not readily available. The aromatic pendant constituents of the polymer can be alkyl substituted, but in most cases, will not be so substituted. The polystyrene used to produce the brominated polystyrenes used pursuant to this invention will have a $M_w$ within the range of from about 500 to about 500,000 and a polydispersity within the range of from above about 1 to about 4. For most purposes, the polystyrene reactant will have a $M_w$ within the range of from about 100,000 to about 300,000 and will have a polydispersity within the range of from about 1.25 to about 2.5. The lower molecular weight polystyrene reactants will have a $M_w$ within the range of from about 500 to about 100,000 and a polydispersity less than about 10 and preferably within the range of from above 1 to about 4. Higher molecular weight polymer reactants of this invention have a $M_w$ within the range of from about 300,000 to about 500,000 and a polydispersity within the range of from above 1 to about 4. The $M_w$ and polydispersity values are both based on gel permeation chromatography (GPC) techniques which are hereinafter described.

It has also been found preferable that the polystyrene used in the formation of the brominated polystyrenes flame retardant not contain any additives, such as zinc stearate, paraffins, mineral oils and the like. A highly preferred polystyrene is Styron® 612 which is marketed by Dow Chemical Company. However, additive-containing polystyrene such as Styron 668, Styron 677, Styron 680 of Dow Chemical Company, as well as Piccolastic A5, Piccolastic A75, or Piccolastic D125 of Hercules Incorporated, and EA 3300, MB 3200, MC 3100, or EA 3000 of Chevron Chemical Company, or equivalent materials from other producers, can be used.

Production of the Brominated Polystyrene

For purposes of simplification, much of the description hereinafter refers to preparation of brominated polystyrene, the preferred flame retardant of this invention. It will be appreciated that the principles and procedures described are applicable to preparation of other brominated styrenic polymers.

The brominated polystyrenes used in the practice of this invention are not conventionally produced. Generally, a suitable process comprises feeding a mixture of bromine and a solution of bromochloromethane and polystyrene (2.5 to 5 moles of bromine per mole of polymerized styrene in the polystyrene) to a reactor containing a further amount of bromochloromethane and a catalytic amount of $AlCl_3$. The mixture of polystyrene, bromochloromethane and bromine is substantially free of a bromination catalyst. The phrase, "substantially free of a bromination catalyst," is to be taken to mean less than a catalytically effective amount of catalyst. With such low amounts of catalyst, little or no catalyzed bromination or cross-linking should occur. Generally, such amounts will be less than 500 ppm based on the weight of polystyrene reactant present. The reaction temperature will be within the range of from about −10° C. to about 15° C. Preferably, the reaction is conducted at one or more temperatures in the range of about −10° C. to about 10° C. as this provides product of the highest quality and, surprisingly, the reaction itself proceeds at a suitably rapid rate at these low temperatures such that the process meets commercial production requirements. After the reaction mass is formed, it is usually maintained at reaction temperature for a period in the range of about 5 minutes to 2 hours, and preferably in the range of about 5 minutes to about 60 minutes. After this period, the reaction product is worked up by adding water and then settling to remove the acidic phase. Multiple water washes can be performed as desired. Next the reaction mass is treated with a base such as sodium hydroxide, sodium sulfite, and/or sodium borohydride, usually as an aqueous solution, to adjust the reaction pH to a suitable level of basicity and kill any remaining brominating agent. After these treatments, the reaction mass is settled to obtain a two-phase reaction mars containing an organic phase, which contains, as a solute, the brominated styrenic polymer product and an aqueous phase. The aqueous phase is decanted and the remaining organic phase is stripped of its solvent component. It is most convenient to accomplish this strip by pumping the organic phase into boiling water. As the solvent is flashed off, the brominated styrenic polymer product forms a precipitate. The precipitate can be recovered by any liquid-solid separation technique, e.g., filtration, centrifugation, etc. The recovered precipitate is then dried. If desired, a thermal stabilizing amount of base can be incorporated in the finished brominated polystyrene composition. That is, the finished brominated polystyrene composition can be treated to contain an amount of alkali metal base such that if a sample of the finished composition is dissolved in bromochloromethane and the resultant solution is extracted with water, the aqueous extract has a pH of at least about 9.0, preferably a pH in the range of about 9.5 to about 11, and more preferably in the range of about 10 to about 10.5. Commonly-owned application Ser. No. 09/066,172, filed April 24, 1998, describes processes in which a suitable amount of aqueous base is employed to improve the thermal stability of the resultant brominated polystyrene. A preferred way is to suitably increase the amount of base used during the catalyst deactivation stage so that a suitable residual amount of the base remains within the finished brominated polystyrene.

In the production of brominated polystyrene, it is important that the iron content be kept to a minimum, say less than about 10 ppm iron. The introduction of iron into the product usually occurs due to iron equipment which is in contact with the reaction and product streams. Thus, it is preferred to use process equipment which does not act as a source of iron contamination. For example, the equipment can be glass-lined or corrosion resistant alloy.

Figure 1:
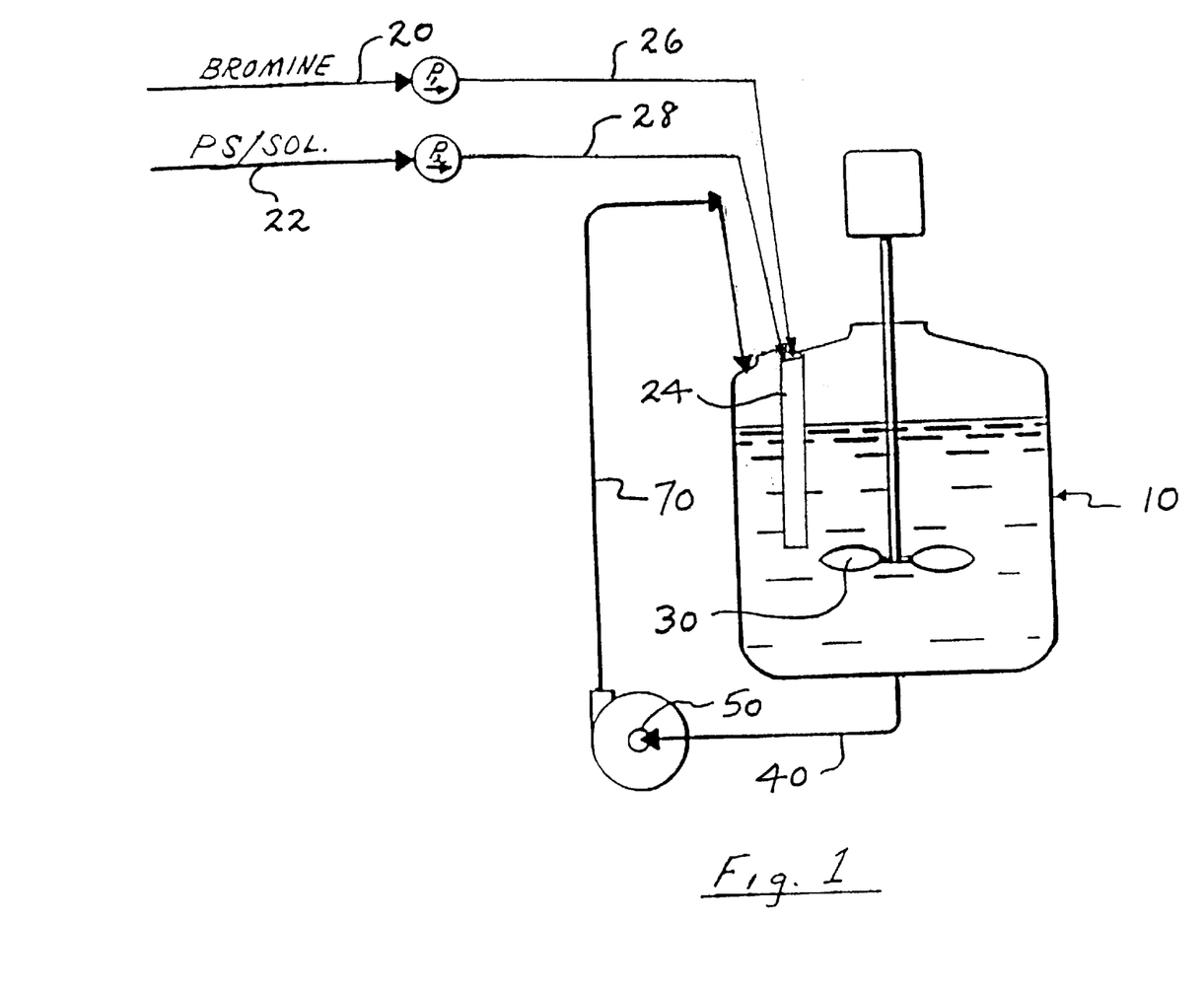
FIG. 1 is a schematic diagram depicting a process suitable for producing preferred brominated polystyrenes for use in the practice of this invention.

A more detailed process description with reference to the accompanying drawing is given below.

Detailed Description of Bromination Process with Reference to the Drawing

Preferred process technology for producing brominated polystyrenes is described herein. It will be appreciated that, unless otherwise indicated in the specification hereof or specified in any claim hereof, this invention is not limited to use of all of this preferred process technology.

Polystyrenes useful for the production of the brominated polystyrenes by this preferred process are any of those which have been described above. Also, as mentioned previously, it is preferred that the polystyrene be additive-free. Again, a most preferred polystyrene reactant is Styron 612 which is marketed by Dow Chemical Company.

The catalyst used in the preferred process can be any of the aluminum based catalysts, e.g., $AlCl_3$, $AlBr_3$ and Al. Mixtures of aluminum catalysts can also be used. Once the catalyst has been added to the reaction system, it may undergo some reaction without significant loss of catalytic activity, e.g., $AlCl_3$ may convert to some extent to $AlBr_3$ $AlCl_3$, because of its availability and price, is the catalyst of choice, and powder grade $AlCl_3$ is most preferred due to its ease of dispersibility.

The catalyst is used in an amount which is sufficient to obtain the catalytic effect sought. These catalytic amounts will depend on the activity of the catalyst, but will generally fall within the range of from about 0.2 to about 10 weight percent and preferably within the range of from about 0.5 to about 5 weight percent, based on the weight of the styrenic polymer being brominated. The most active catalysts will be used in the lower amounts, while the less active catalysts will be used in the higher amounts. When $AlCl_3$ is the catalyst, amounts within the range of from about 0.5 to about 3 weight percent are preferred.

The brominating agent is preferably bromine. Bromine can be obtained commercially in the diatomic form or can be generated by the oxidation of HBr. $Br_2$ can be supplied either as a liquid or a gas. The amount of brominating agent used in the process should provide an overall mole ratio of total brominating agent to total styrenic polymer fed which will provide from about 1 to about 3 bromine substitutions per styrenic monomer unit in the polymer. It is preferred that the brominated polystyrene contain at least about 60 wt % bromine, and desirably at least about 68 wt % bromine and most preferably within the range of from about 69 to 71 wt % bromine. For any particular styrenic polymer, the amount of brominating agent used in the process will be determined by the bromine content desired considering the highest bromine content which is obtainable with the process parameters chosen. The higher bromine contents will require the most brominating agent. It is pointed out that as perbromination is approached, it becomes more difficult to substitute the last bromines. Adding ever larger amounts of a brominating agent does not always attenuate this difficulty. The stoichiometry is easily determined as it requires one mole of $Br_2$ per substitution sought. In practice, the practitioner will determine the bromine content sought on a weight basis and then will calculate, on an idealized basis, the number of moles of brominating agent needed to obtain the same. For example, if the styrenic polymer is polystyrene and the bromine content sought is 68 wt %, at least 2.7 moles of bromine per styrenic monomer unit will be required, not including any desired stoichiometric excess.

All of the bromine can be added with the polystyrene-bromochloromethane solution or a portion of the bromine can be pre-added to the reactor with the remainder being added with the solution. If pre-addition is to be used then the pre-added portion will amount to 0.5 to 20% of the total bromine used in the process.

While the foregoing describes the overall quantitative relationship between the brominating agent and styrenic polymer, the quantitative relationship between these two reactants in the feed mixture has not been fully discussed. Generally, the mixture which is to be fed is formed from about 1 to about 8 moles of brominating agent per mole of styrenic monomer units at any time during the feed period. During the feed, the quantitative relationship can be constant or can vary within the above-mentioned range. (It is possible to allow for some excursions outside of the range so long as such does not do significant harm to the process efficiency or to product quality.) A preferred range is from about 2.5 to about 5 moles of brominating agent per mole of styrenic monomer units to form the feed mixture. As can be appreciated, the use of an amount of brominating agent in the feed mixture which gives a mole ratio of brominating agent to styrenic monomer units which is less than or greater than the selected overall mole ratio of brominating agent to styrenic monomer units will result in exhaustion of either the brominating agent or the styrenic polymer as a mixture constituent before exhaustion of the other constituent. For example, if the practitioner chooses to produce brominated polystyrene with a 70 wt % bromine content, an overall molar ratio of bromine to styrenic monomer units of 3.0:1 would be suitable. If the practitioner chooses to form a feed mixture in which the molar ratio of bromine to styrenic monomer units is 1:1, it can be seen that the amount of polystyrene to be fed will be completed before obtaining the needed overall amount of bromine. In this case, the practitioner first uses the 1:1 mixture and then continues on with just a bromine feed after the polystyrene feed has been exhausted. If, on the other hand, the molar ratio in the feed mixture is chosen to be 5:1, then the bromine will first become exhausted and the feed will have to be finished with the polystyrene alone. Generally, it is preferred to have the overall molar ratio and the feed mixture ratio at least somewhat similar. In all cases though, the initial feed should preferably contain at least a molar ratio of bromine to styrenic monomer units of 1:1.

It is preferred that the bromine used in the process be essentially anhydrous, i.e., contain less than 100 ppm (weight basis) water and contain no more than 10 ppm organic impurities, e.g., oil, grease, carbonyl containing hydrocarbons, iron, and the like. Available, commercial grade bromine may have such purity. If, however, such is not available, the organic impurities and water content of the bromine can be conveniently reduced by mixing together a 3 to 1 volume ratio of bromine and concentrated (94–98 percent) sulfuric acid. A two-phase mix is formed which is stirred for 10–16 hours. After stirring and settling, the sulfuric acid phase, along with the impurities and water, is separated from the bromine phase. To further enhance the purity of the bromine, the recovered bromine phase can be subjected to distillation.

The preferred organic solvent for the bromination, namely, bromochloromethane, is preferably essentially anhydrous, containing less than 100 ppm (weight basis) water. It is most preferred that the solvent contain as little water as is practically obtainable, say between 0 to 30 ppm (weight basis).

The process benefits from the reaction mass being in an anhydrous condition. Water tends to affect the catalytic activity of the aluminum catalyst, which effect may hinder the quick aromatic bromination of the styrene rings. If, for some reason, the practitioner has large amounts of water in the process and dewatering is not practical, then it may be possible to overcome the situation by simply increasing the amount of catalyst used.

By forming a solution of bromochloromethane and styrenic polymer, the polymer becomes easy to handle and mix with bromine. These solutions preferably contain from about 5 to about 50 wt % polymer. More highly preferred are those which contain from about 5 to about 30 wt % polymer.

It is preferred to have the bromination catalyst, to which the bromine/styrenic polymer mixture is fed, to be in association with bromochloromethane so that the catalyst can be in a solution, slurry, dispersion or suspension. Such will enhance reaction mass mixing and mass transfer qualities. The mixture of bromochloromethane and catalyst is best described as a suspension. Generally, it is suitable to use from about 95 to about 99.9 wt %, preferably from about 99 to about 99.8 wt %, bromochloromethane, based on the total weight of bromochloromethane and catalyst.

The styrenic polymer/brominating agent mixture feed should occur expeditiously, with consideration being given to the ability of the process equipment to handle the heat load from the exothermic process, the evolving HBr, and other process concerns. In short, the feed can occur over the shortest time period that will be allowed by the equipment without excursion outside of critical process parameters. Generally, it is anticipated that the feed period will be from 0.5 to 3 hours for a commercial-size plant. Shorter feed periods are expected for smaller scale processes.

It is possible to conduct the bromination reaction at a temperature within the range of from about −20° C. to about 60° C. Desirably, the bromination temperature is maintained within the range of from about −10° C. to about 15° C. Most preferred temperatures are in the range of from about −10° C. to about 0° C. This last-mentioned temperature range provides product of the highest quality and, surprisingly, the reaction itself proceeds at a suitably rapid rate at these low temperatures such that the process meets commercial production requirements. The pressure can be atmospheric, subatmospheric or superatmospheric.

In carrying out the process, a bromination catalyst, preferably powdered $AlCl_3$, is suspended in essentially anhydrous bromochloromethane, to give an easily stirrable suspension. The suspension is prepared in a glass-lined, stirred reactor and brought to a temperature within the range of from about −10° C. to about −5° C. The mix is kept under an inert, dry atmosphere in the reactor. A solution of a styrenic polymer and bromochloromethane is prepared and intimately mixed with a bromine stream to yield a homogenous mixture. The mixture is fed into the stirred bromination catalyst suspension in the reactor. The intimate mixing of the styrenic polymer solution and bromine can be accomplished in a number of ways. For example, the solution and bromine can be fed to a mixing device, e.g., a mixing nozzle, at the lower end of the diptube in the reactor which extends to a point below the suspension level. The mixing device is designed to obtain the intimate mixing of the solution and bromine. Also, the mixing device acts to impart mixing energy, at the point of feed, to the intimate mixture and catalyst suspension. Another technique for obtaining intimate mixing of the styrenic polymer solution and brominating agent, is to use an exterior reactor loop having an in-line mixer, such as an impingement mixer. Generally, the use of an exterior reactor loop includes first charging the reactor with a bromination catalyst slurry, suspension, etc., and then withdrawing from the reactor a stream which is then fed to a mixer external of the reactor. A mixture formed from at least bromine and styrenic polymer is also fed to the mixer to yield a second mixture which is formed from the two feeds to the mixer. The second mixture is subsequently fed back to the reactor. The stream withdrawn from the reactor will initially comprise the catalyst. After the second mixture is fed to the reactor and the process runs, the withdrawn stream will begin to comprise brominated polystyrene along with catalyst.

Exemplifying the use of a reactor jet mixer, reference is made to FIG. 1 wherein there is shown a reactor, generally designated by the numeral 10. Reactor 10 is a stirred reactor, and initially it contains a suspension comprising catalyst and bromochloromethane. Reactor discharge conduit 40 provides a recycle stream from reactor 10 which is fed to pump 50. Pump 50 pressurizes the stream so that it is fed with force via conduit 70 back to reactor 10. Bromine is fed via conduit 20 to pump $P_1$ while, at the same time, a solution of polystyrene and bromochloromethane is fed via conduit 22 to pump $P_2$. Pumps $P_1$ and P2 feed jet mixer 24 via lines 26 and 28, respectively, to thereby produce an intimate mixture of bromine, polystyrene, and solvent. This intimate mixture is fed into the reaction mass in proximity to agitator 30 to ensure thorough mixing of the reactor contents. The removal of contents from, and their recycle back to, reactor 10, and also the feed of fresh reactants to jet mixer 24 are continued until at least substantially all of the bromine and polystyrene/bromochloromethane solution have been fed into the reaction mass.

As can be appreciated, the contents of reactor 10 change in composition during the bromine and bromochloromethane solution feeds. Initially, the contents of reactor 10 comprise catalyst and solvent. As the process runs, the reactor contents comprise and begin to become more rich in brominated polystyrene.

Irrespective of whether or not a diptube mixer or an exterior impingement mixer is used, the bromination of styrenic polymer will yield HBr as a major by-product. The HBr formed in the process first saturates the solvent and from then on HBr escapes into the head space above the reactor contents. It is preferred that the HBr be removed and passed to a water scrubber or stored as dry HBr. A dry, inert gas, e.g., nitrogen, can be used as a pad over the reactor contents to minimize the presence of water therein.

The reactor, in all cases, is preferably kept at a low temperature, e.g., from about −10° C. to about 10° C., during the feed of the styrenic polymer and/or brominating feed, as the case may be, and most preferably from about −10° C. to about 5° C. Also, after the feed is accomplished, the reactor is maintained at reaction temperature (desirably in the range of −10° C. to about 15° C. and preferably in the range of −10° C. to about 10° C.) for a period of from about 5 minutes to about 2 hours and preferably from about 5 to about 60 minutes. Such additional period of time following completion of the feed serves to continue the bromination until the desired degree of bromination has been achieved. Such period will be longer if the reaction parameters provide for mild bromination conditions during the bromine-polystyrene feed than if the parameters chosen provide for more severe bromination conditions during the feed. Also, such period will be longer if a high degree of bromination (e.g., above 69 wt % bromine in the brominated polystyrene) is sought. The reaction mass can be kept in the reactor during the additional period of time following completion of the feed. Also, the hold period can be used to strip more HBr from the reaction mass by using an inert gas sweep.

When the desired degree of bromination has been achieved, the reaction mass can be treated with water to deactivate the catalyst. Then the reaction mass is settled to remove the aqueous HBr phase. Sodium sulfite or sodium borohydride, typically as an aqueous solution, can then be added to remove any remaining brominating agent, followed by sodium hydroxide, again typically as an aqueous solution, to adjust the pH of the reaction mass. If desired, additional sodium hydroxide or other alkali metal base can be added in a suitable amount and preferably in the form of an aqueous solution to act as a stabilizer for the brominated polystyrene. The reaction mass is settled to obtain a two-phase reaction mass containing an organic phase, which contains, as a solute, the brominated styrenic polymer product, and an aqueous phase. The aqueous phase is decanted and the remaining organic phase is stripped of its solvent component. It is most convenient to accomplish this strip by pumping the organic phase into boiling or near-boiling water. As the solvent is flashed off, particles of the brominated styrenic polymer product form in and separate from the residual liquid phase as a precipitate, and if desired concurrently a suitable amount of the base can be incorporated into the particulate brominated polystyrene as it is being formed. If desired, a surfactant, such as dioctyyl sulfosuccinate sodium salt, can be added to the hot water. The amount of dioctyl sulfosuccinate, if used, can be within the range of from about 0.01 to about 0.05 wt %, based upon the total weight of water and surfactant. The precipitate can be recovered by any liquid-solid separation technique, e.g., filtration, centrifugation, etc. The recovered precipitate is then dried.

Analytical Methods

Since brominated styrenic polymers have good or at least satisfactory solubility in solvents such as tetrahydrofuran (THF), the determination of the total bromine content of the brominated styrenic polymer is easily accomplished by using conventional X-Ray Fluorescence techniques. The sample analyzed is a dilute sample, say 0.1±0.05 g brominated polystyrene in 60 mL THF. The XRF spectrometer can be a Phillips PW1480 Spectrometer. A standardized solution of bromobenzene in THF is used as the calibration standard. The bromine values described herein and reported in the Examples are all based on the XRF analytical method.

To determine the color attributes of the brominated polymers used pursuant to this invention, use is again made of the ability to dissolve brominated styrenic polymers in easy-to-obtain solvents, such as chlorobenzene. The analytical method used is quite straight-forward. Weigh 5 g±0.1 g, of the brominated polystyrene into a 50 mL centrifuge tube. To the tube also add 45 g±0.1 g chlorobenzene. Close the tube and shake for 1 hour on a wrist action shaker. After the 1 hour shaking period, examine the solution for undissolved solids. If a haze is present, centrifuge the solution for 10 minutes at 4000 rpm. If the solution is still not clear, centrifuge an additional 10 minutes. Should the solution remain hazy, then it should be discarded as being incapable of accurate measurement. If, however, and this is the case most of the time, a clear solution is obtained, it is submitted for testing in a HunterLab ColorQuest Sphere Spectrocolorimeter. A transmission cell having a 20-mm transmission length is used. The colorimeter is set to "Delta E-lab" to report color as ΔE and to give color values for "L," "a" and "b".

DSC values were obtained with a TA Instruments DSC Model 2920. Samples were heated from 25° C. to 400° C. at 1° C./min under nitrogen.

Thermogravimetric analysis (TGA) is used to test the thermal behavior of the brominated styrenic polymers used pursuant to this invention. The TGA values are obtained by use of a TA Instruments Thermogravimetric Analyzer. Each sample is heated on a Pt pan from 25° C. to about 600° C. at 10° C./min with a nitrogen flow of 50–60 mL/min.

To determine thermal stability and estimate the corrosive potential of a sample, the following test procedure as described in U.S. Pat. No. 5,637,650 is used. Each sample is run in duplicate. A 2.00±0.01 g sample is placed into a new clean 20×150 mm test tube. With a neoprene stopper and Viton® fluoroelastomer tubing, the test tube is connected to a nitrogen purge line with exit gas from the test tube being passed successively through subsurface gas dispersion frits in three 250-mL sidearm filter flasks each containing 200 mL of 0.1 N NaOH and 5 drops of phenolphthalein. With a constant nitrogen purge at 0.5 SCFH, the test tube is heated at 300° C. in a molten salt bath (51.3% $KNO_3$/48.7% $NaNO_3$) for 15 minutes followed by 5 minutes at ambient temperature. The test tube containing the sample is then replaced with a clean dry test tube, and the apparatus is purged with nitrogen for an additional 10 minutes with the empty test tube in the 300° C. salt bath. The test tube, tubing and gas dispersion tubes are all rinsed with deionized water, and the rinse is combined quantitatively with the solutions in the three collection flasks. The combined solution is acidified with 1:1 $HNO_3$ and titrated with 0.01 N $AgNO_3$ using an automatic potentiometric titrator (Metrolim 670, 716, 736, or equivalent). Results are calculated as ppm HBr, ppm HCl, and ppm BBr equivalents as follows:

ppm HBr=(EP 1)(N)(80912)/(sample wt.)

ppm HCl=(EP 2-EP 1)(N)(36461)/(sample wt.)

ppm HBr equivalents=(EP2)(N)(80912)/(sample wt.) where EP(x)=mL of $AgNO_3$ used to reach end point x; and N=normality of $AgNO_3$. The tubing is thoroughly dried with nitrogen before the next analysis. Each day before the first sample, three empty clean test tubes are run as blanks to assure there is no residual hydrogen halide in the system.

The $M_w$ values were obtained by GPC using a Waters model 510 HPLC pump and, as detectors, a Waters Refractive Index Detector, Model 410 and a Precision Detector Light Scattering Detector, Model PD2000. The columns were Waters, μStyragel, 500 Å, 10,000 Å and 100,000 Å. The autosampler was a Shimadzu, Model Sil 9A. A polystyrene standard ($M_w$=185,000) was routinely used to verify the accuracy of the light scattering data. The solvent used was tetrahydrofuran, HPLC grade. The test procedure used entailed dissolving 0.015–0.020 g of sample in 10 mL of THF. An aliquot of this solution is filtered and 50 μL is injected on the columns. The separation was analyzed using software provided by Precision Detectors for the PD 2000 Light Scattering Detector.

The calculated theoretical $M_w$ values were obtained in accordance with the equation:

$$\text{Theoretical } M_w BrPS = M_w PS + \frac{(M_w PS)(\text{Atom.wt.} Br - \text{Atom.wt. } H)(\text{Mol. wt. Sty.})(0.01)(\text{wt\% } Br)}{(\text{Atom. wt. } Br)(\text{Mol. wt Sty.}) - (\text{Atom. wt. } Br - \text{Atom. wt. } H)(\text{Mol. wt. Sty.})(0.01)(\text{wt \% } Br)}$$

As used throughout this application, "PS" is used interchangeably with and meant to -designate polystyrene. The term "$M_w$" means weight average molecular weight as determined by GPC (light scattering detector) described supra.

Substrate Polymer, Other Components, Proportions

Particular thermoplastics with which the foregoing brominated styrenic polymers are blended include polyethylene terephthalate, polybutylene terephthalate, polycyclohexylene dimethylene terephthalate, polytrimethylene terephthalate, blends or mixtures of two or more of these, and analogous copolymeric thermoplastic polyesters, especially when filled or reinforced with a reinforcing filler such as glass fiber. Preferred thermoplastic polyesters are polyethylene terephthalate and polybutylene terephthalate. Polyamide thermoplastics, such as polyamide 6, polyamide 6,6, polyamide 12, etc., again preferably when glass filled, can also be effectively flame retarded in like manner. Conventional additives, such as flame retardant synergists, antioxidants, UV stabilizers, pigments, impact modifiers, fillers, acid scavengers, blowing agents, and the like, can be included with the formulations as is appropriate. As noted above, preferred compositions of this invention do contain a flame retardant synergist or glass fiber filler or reinforcement, and most preferably both a synergist, and a reinforcing fiber and/or filler.

The brominated styrenic polymer flame retardants used in the practice of this invention are used in flame retardant amounts, which typically are within the range of from about 5 to about 20 wt %, the wt % being based on the total weight of the polyalkylene terephthalate formulation or blend. When used, the amount of reinforcing fillers such as glass fiber will typically be in the range of up to about 50 wt % based on the total weight of the finished composition. The amount of flame retardant synergist, when used, such as antimony trioxide, antimony pentoxide, sodium antimonate, potassium antimonate, iron oxide, zinc borate, or analogous synergist generally will be in the range of up to about 12 wt % based on the total weight of the finished composition.

Masterbatch compositions wherein the components except for the polyalkylene terephthalate are in suitable relative proportions but are blended in a smaller amount of the polyalkylene terephthalate, are also within the scope of this invention. Thus, this invention includes compositions which comprise at least one polyalkylene terephthalate with which has been blended a brominated styrenic polymer of the type used in the practice of this invention in a weight ratio (polyalkylene terephthalate:brominated styrenic polymer) in the range of, say, 1:99 to 70:30. Such masterbatch blends need not, but may also contain filler or reinforcing fiber and/or at least one flame retardant synergist such as iron oxide, zinc borate, or preferably an antimony oxide synergist such as antimony trioxide, antimony pentoxide, sodium antimonate, or potassium antimonate. Typical examples of reinforcing agents or fillers that can be used include low-alkali E-glass, carbon fibers, potassium titanate fibers, glass spheres or microballoons, whiskers, talc, wollastonite, kaolin, chalk, calcined kaolin, and similar substances. Sizing agents can be used with such reinforcing agents or fillers, if desired. A number of suitable glass-filled polyalkylene terephthalates molding compositions are available on the open market, and these can be used in preparing the compositions of this invention.

Also provided by this invention are additive blends composed of brominated styrenic polymer of the type used in the practice of this invention and a synergist such as, for example, a blend of 75 parts by weight of the brominated polystyrene and 25 parts by weight of a synergist such as antimony trioxide, antimony pentoxide, sodium antimonate, potassium antimonate, iron oxide, zinc borate, or analogous synergist. Typically, such blends will contain in the range of about 70 to about 98 parts by weight of the brominated polystyrene and about 30 to about 2 parts by weight of the synergist, with the total of the two components being 100 parts by weight. Suitable amounts of other suitable additive components can also be included in such additive blends.

Various known procedures can be used to prepare the blends or formulations constituting the compositions of this invention. For example the polyalkylene terephthalate polymer and the brominated styrenic polymer flame retardant and any other components or ingredients to be incorporated into the finished blend can be blended together in powder form and thereafter molded by extrusion, compression, or injection molding. Likewise, the components can be mixed together in a Banbury mixer, a Brabender mixer, a roll mill, a kneader, or other similar mixing device, and then formed into the desired form or configuration such as by extrusion followed by comminution into granules or pellets, or by other known methods.

The following Examples are presented for purposes of illustration and are not to be construed as imposing limitations on the scope of the invention.

Examples 1–3 give preferred general procedures for producing brominated polystyrene suitable for use in the practice of this invention.

EXAMPLE 1

A mixture of 770.0 g bromochloromethane (BCM, 9 ppm water) and 2.775 g powdered $AlCl_3$ was prepared in a 5-L jacketed glass reactor equipped with a mechanical paddle stirrer, condenser, and thermowell. A jacketed glass mixing tee was mounted on an inlet port on the reactor to which bromine (533.35 g, 3.337 mole) and a solution of 134.00 g (1.287/n mole) polystyrene (Mitsubishi Kasei Polytex, $M_w$=270,000) in 1204 g BCM were pumped at average rates of 8.74 g/min and 20.27 g/min, respectively. The reactor and mixing tee were cooled with a circulating glycol bath to maintain a temperature of 0° C. to 2° C. throughout the 1 hour feed time and subsequent 1 hour cook. The reaction mixture was then washed with water and neutralized with a mixture of aqueous sodium gluconate, sodium sulfite, and sodium hydroxide. After diluting the organic phase with additional BCM (1450 g), the solution was added dropwise to 1.8 L hot (90° C.–94° C.) water containing 0.25 g dioctyl sulfosuccinate sodium salt (surfactant) to precipitate the product and distill the solvent. The slurry was filtered and the off-white solid was washed with water. Drying to constant weight at 150° C. gave 389.8 g.

EXAMPLE 2

A 7.209 g (54.1 mmol) portion of powdered aluminum chloride was suspended (stirred at 250 rpm) in 1549.83 g of dry (10 ppm water) bromochloromethane (BCM) in a 5-L jacketed reaction flask cooled to 0° C. by a circulating glycol bath. A 10.00 wt % solution of PS (360.96 g, 3.4657/n mol) in dry BCM (3250.44 g) was prepared in a second 5-L flask. The PS used was Dow Styron® 612 which had a $M_w$ of 190,000. The PS solution was pumped from the bottom valve of this feed reservoir to a jacketed, glycol-cooled mixing tee mounted on the reaction flask. At the same time, bromine was pumped from a tared feed reservoir to the same mixing tee where it combined with the polystyrene solution before dropping into the stirred catalyst suspension in the reaction flask. Two Masterflex® 7550-90 pumps were used. The PS feed system used an all-Teflon feed line with pump head 77390 operating at a constant speed of 60 rpm. This provided a constant feed rate of 21.02)/n mmol PS/min (21.89 g/min). The bromine feed system used a combination of Teflon and Viton tubing with pump head 7518-10 operating at a rate of 70.05 mmol/min for the first 18 min, 38.80 mmol/min for 18–23 min, and 56.75 mmol/min for 23–165 min. Both feeds ended at 165 min. The overall mole ratio of $Br_2$/PS was 2.70. A rinse of 260.95 g of dry BCM was used for the PS solution feed system to assure complete transfer of the polymer to the reaction flask. The reaction temperature was maintained at 0° C. to 4° C. throughout the addition and subsequent 2.3 hour cook period (with nitrogen purge of the reactor overhead). The weight increase for the caustic exit gas scrubber was 665.4 g (87.8% of theory for HBr). The catalyst was deactivated by addition of 125.0 g of a 10 wt % aqueous solution of sodium gluconate. A 63.41 g portion of 10 wt % aqueous sodium sulfite was added, and the pH was adjusted to 14 by addition of 423.0 g of 10 wt % aqueous NaOH. After dilution with BCM (1334.6 g), the organic phase was separated and then washed with water (1011.8 g). The product was recovered from the organic phase by addition to vigorously stirred hot (90° C.–94° C.) water to which was added 1.23 g of the sodium salt of dioctyl sulfosuccinate. The solvent distilled from the hot water leaving a slurry of brominated polystyrene product in water. After suction filtering, the off-white solid was rinsed with water and dried to a constant weight of 1085.98 g (97.9% yield) in a vacuum oven (150° C./2 torr/5 hr).

EXAMPLE 3

The procedure of Example 2 was followed except that: a 2-L flask and 40 g of polystyrene were used; the $AlCl_3$ wt % (based on polystyrene) was 2.0 wt %; the feed mole ratio of bromine to polystyrene was 3.33; the total equivalents of bromine was 2.78; the temperature range was 0° C. to 5° C.; the feed times for the bromine/polystyrene was 32 min/38 min; and the cook time was 150° minutes.

Comparative Examples CE-1 and CE-2 describe the preparation of brominated polystyrene in accordance with the teachings of U.S. Pat. No. 5,532,322, which issued in 1996.

COMPARATIVE EXAMPLE CE-1

A solution of 75.10 g (0.721/n mole) of polystyrene (Mitsubishi Kasei Polytex, $M_w$=270,000) in 750 g of 1,2-dichloroethane (EDC, containing 12 ppm water) was prepared in a 5-L jacketed glass reactor equipped with a mechanical paddle stirrer, condenser, and thermowell. The temperature of the reaction was controlled with an ethylene glycol circulating bath on the reactor jacket. After cooling to 15° C., 11.03 g of antimony (III) oxide was added to the polystyrene solution. A previously prepared solution of 149.7 g (0.937 mole) bromine and 66.3 g (0.935 mole) chlorine in 505 g cold (−5° C.) EDC was added to the reactor under the liquid surface through a diptube attached to the cooled bromine chloride feed reservoir. The reaction temperature was slowly increased from 10° C. to 25° C. during the 2 hour addition. The mixture was then held at 30° C. until hydrogen halide evolution was complete (1.5 hr) as indicated by an end of the weight gain of the caustic scrubber on the exit gas line from the reactor. The reaction mixture was washed with water and neutralized with aqueous sodium sulfite and caustic. The organic phase was then added dropwise to 3.5 L methanol to precipitate the product. The slurry was filtered and the solid was washed with methanol. After vacuum drying at 150° C., the light yellow solid (product 1) weighed 203.7 g.

COMPARATIVE EXAMPLE CE-2

Comparative Example CE-1 was repeated using 230.8 g (2.00 mole) commercial bromine chloride with 80.20 g (0.770/n mole) polystyrene and 11.77 g $Sb_2O_3$. The water washed and neutralized organic phase was divided into two equal portions. One portion was added to 1.5 L of methanol as in Example CE-1 to obtain 101.6 g of light yellow solid (product A) after drying to constant weight at 150° C. The other portion was added dropwise to 1.9 L of hot (89° C.–94° C.) water to precipitate the product and distill the solvent. The dry light yellow solid (product B) weighed 100.3 g.

In Table I a compilation of the properties of the brominated polystyrene products produced in Examples 1–3 and Comparative Examples CE-1 and CE-2 is given. In addition, the properties of Pyro-Chek 68PB flame retardant of Ferro Corporation are given. Pyro-Chek 68PB flame retardant is believed to be produced in accordance with the teachings of U.S. Pat. No. 4,352,909.

perature Under Load (D648) ⅛" at 264 psi; IZOD Impact Strength (D256) Method A; LOI (D2863) Specimen Type A; Melt Index (D1238) Procedure A, 250° C./2.16 Kg; Comparative Tracking Index (D3638). Also, the UL-94 burn test was performed.

In addition, specimens were oven aged at 180° C. for 1 week. These specimens were then tested for Tensile Strength (D638) specimen type 1 and Comparative Tracking Index (IEC-950 and 112). Also, the color change was measured.

TABLE I

ANALYTICAL RESULTS

| Example | 1 | 2 | 3 | CE-1 | CE-2 A | CE-2 B | Pyro-Check 68PB |
|---|---|---|---|---|---|---|---|
| Total Br (wt %) | 69.5 | 68.9 | 69.8 | 63.48 | 63.10 | 63.00 | 67.2 |
| Thermal Stability[1] (ppm HBr) | 380 | 104 | 85 | 3250 | 2560 | 3770 | 1960 |
| Total Cl (wt %) | <0.01 | — | <0.01 | 1.00 | 0.68 | 0.83 | 0.71 |
| GPC $M_w$ (light scat.) | 920,000 | — | 620,000 | 560,000 | 580,000 | 580,000 | 620,000 |
| Calc'd. Theo. $M_w$ GPC (light scat.) | 860,000 | 590,000 | 610,000 | 720,000 | 715,000 | 715,000 | n/d[2] |
| DSC Tg[3] (° C.) | 190 | — | — | 170 | 164 | 162 | 185 |
| TGA 1% wt loss @ (° C.) | 349 | 357 | 375 | 312 | 311 | 293 | 300 |
| Solution Color | | | | | | | |
| L | 96.32 | 96.47 | 96.86 | 96.21 | 94.99 | 94.62 | 92.03 |
| a | −2.09 | −2.45 | −2.30 | −2.36 | −2.32 | −2.33 | −0.17 |
| b | 11.99 | 14.30 | 11.16 | 15.07 | 16.96 | 17.06 | 23.38 |
| ΔE | 12.72 | 14.90 | 11.84 | 15.71 | 17.83 | 18.03 | 24.70 |

[1]Determined by use of the method of U.S. Pat. No. 5,637,650 as described above.
[2]Calculated Theoretical $M_w$ for Pyro-Chek 68PB could not be determined since the $M_w$ of the polystyrene reactant used in 68PB is not known.
[3]Tg = glass transition temperature.

A study was performed to determine comparative performance of 30% glass-filled polybutylene terephthalate (PBT) compounded with a brominated polystyrene used pursuant to this invention (SAYTEX® HP-7010 Flame Retardant (Albemarle Corporation) ("HP-7010"); and a brominated polystyrene unsuitable for the practice of this invention (Pyro-Chek® 68PB; Ferro Corporation) ("68PB"). Mechanical, electrical, Theological, and flammability properties were measured on the flame retarded compounds. In addition, some heat aged properties were determined. Details of this study are presented in Example 4 and Table II.

EXAMPLE 4

The PBT resin (Crastin 6134) was dried in a forced air desiccant dryer at 120° C. for four hours prior to extrusion. The formulations were extruded in a Werner & Pfleiderer ZSK25 co-rotating twin-screw extruder (25 mm). The resin, additives, and glass fiber were fed into the extruder in separate feeders, with the glass fiber being fed downstream. The screw speed was 350 rpm. Temperatures along the barrel ranged from 200 to 235° C. from the feed zone to the die. The melt temperature at the die was approximately 290° C. Extruded pellets were dried at 120° C. for four hours prior to injection molding. Parts for testing were produced in a Battenfeld BSKM 100/40 injection molding machine with a temperature profile of 249-254-266-266° C. and a mold temperature of 55° C. Samples were prepared for various tests.

The following ASTM test procedures were performed: Tensile Strength (D638) specimen type 1; Deflection Tem- The results are summarized in Table II.

TABLE II

FORMULATIONS AND FLAMMABILITY DATA

| Flame Retardant Used | None | HP-7010 | 68PB |
|---|---|---|---|
| Components | | | |
| PBT: Crastin 6134 (wt %) | 70.0 | 52.9 | 52.9 |
| Glass Fibers: Vetrotex 5252 (wt %) | 30.0 | 30.0 | 30.0 |
| Flame Retardant (wt %) | — | 12.1 | 12.1 |
| $Sb_2O_3$ (wt %) | — | 5.0 | 5.0 |
| Bromine Content (wt %) | 0 | 8.2 | 8.2 |
| Flammability | | | |
| UL-94 @ 1/16 inch | Burn | V-0 | V-0 |
| UL-94 @ 1/32 inch | Burn | V-0 | V-0 |
| LOI | 19.4 | 32.3 | 31.0 |
| Physical Properties | | | |
| Tensile Yield (psi × $10^3$) | 17.9 | 17.5 | 17.3 |
| Tensile Modulus (psi × $10^5$) | 12.7 | 15.3 | 15.3 |
| Elongation (Yield) (Break) | 2.8; 3.0 | 2.3; 2.3 | 2.0; 2.0 |
| Flexural Strength (psi × $10^3$) | 29.4 | 28.6 | 28.0 |
| Flexural Modulus (psi × $10^5$) | 11.6 | 14.5 | 14.8 |
| Izod Impact, ⅛-inch (ft-lb/in) (gated) | 1.7 | 1.3 | 1.2 |
| Gardner Impact (in-lb/in) | 103 | 42 | 32 |
| DTUL, ⅛-inch, 264 psi (° C.) | 200 | 207 | 207 |
| Melt Flow Index (g/10 min) 250° C./2.16 kg | 15.9 | 17.3 | 17.6 |
| Electricals | | | |
| Dielectric Strength (KV/mil) | 0.402 | 0.411 | 0.380 |
| Dielectric Constant | 3.464 | 3.576 | 3.640 |
| Dissipation Factor | 0.0177 | 0.0050 | 0.0021 |
| Volume Resistivity (ohm-cm × $10^{17}$) | >2.0 | >2.0 | >2.0 |

TABLE II-continued

FORMULATIONS AND FLAMMABILITY DATA

| Flame Retardant Used | None | HP-7010 | 68PB |
|---|---|---|---|
| Surface Resistivity (ohm × $10^{17}$) | 2.3 | >2.8 | >2.8 |
| CTI (volts @ 50 drops; average of 3 replicates) | 212 | 285 | 225 |
| UV Stability | | | |
| Color L | 82.0 | 85.8 | 84.9 |
| Color a | −0.1 | 0.3 | 0.8 |
| Color b | 9.0 | 8.2 | 8.2 |
| Color YI | 19.8 | 17.5 | 18.3 |
| Gloss (60°) | 3.7 | 2.9 | 4.1 |
| ΔE 100 hr Xenon Arc | 8.0 | 23.7 | 19.3 |
| ΔE 200 hr Xenon Arc | 8.2 | 26.0 | 20.9 |
| ΔE 300 hr Xenon Arc | 8.3 | 26.2 | 21.0 |
| Properties After Heat Aging (180° C. for 1 week) | | | |
| Color L | 63.8 | 78.3 | 80.6 |
| Color a | 5.1 | 2.5 | 2.3 |
| Color b | 11.8 | 10.7 | 10.2 |
| Color YI | 39.9 | 27.2 | 25.1 |
| ΔE | 19.2 | 8.2 | 5.0 |
| Tensile Yield (psi × $10^3$) | 19.7 | 18.2 | 18.4 |
| Tensile Modulus (psi × $10^5$) | 13.9 | 16.4 | 16.5 |
| Elongation (%) (Yield) (Break) | 2.5; 2.6 | 1.9; 1.9 | 2.0; 2.0 |
| CTI (volts @ 50 drops, average of 3 replicates) | 338 | 238 | 225 |
| Bloom (4 weeks @ 80° C.) | none | none | none |

It can be seen that the comparative tracking index (CTI) of the composition of this invention ("HP-7010") was substantially higher than the comparative composition not of this invention ("68PB"), and that this superiority of the composition of this invention persisted even after aging at elevated temperature.

EXAMPLE 5

Another study similar to the above was performed to determine comparative performance: of glass-filled polyethylene terephthalate (PET) compounded with HP-7010 pursuant to this invention; and for comparison, with 68PB, not in accordance with this invention. In this study the PET used was a blend of two commercially-available glass filled resins. Table III summarizes the materials used and the results obtained.

TABLE III

FORMULATIONS AND FLAMMABILITY DATA

| Flame Retardant Used | None | HP-7010 | 68PB |
|---|---|---|---|
| Components | | | |
| PET: Rynite 530 (30% glass fiber) (wt %) | 100 | 48.7 | 48.7 |
| PET: Rynite 545 (45% glass fiber) (wt %) | — | 34.2 | 34.2 |
| Flame Retardant (wt %) | — | 12.1 | 12.1 |
| $Na_2Sb_2O_3$ (wt %) | — | 5.0 | 5.0 |
| Bromine Content (wt %) | 0 | | |
| Flammability | | | |
| UL-94 @ 1/16 inch | Burn | V-0 | V-0 |
| UL-94 @ 1/32 inch | Burn | V-0 | V-0 |
| LOI | 20.7 | 29.6 | 30.3 |
| Physical Properties | | | |
| Tensile Yield (psi × $10^3$) | 17.1 | 15.8 | 15.6 |
| Tensile Modulus (psi × $10^5$) | 13.0 | 14.9 | 15.2 |
| Elongation (Yield) (Break) | 2.4; 2.4 | 2.2; 2.2 | 2.1; 2.1 |
| Flexural Strength (psi × $10^3$) | 26.3 | 25.4 | 25.0 |
| Flexural Modulus (psi × $10^5$) | 12.1 | 14.2 | 14.3 |
| Izod Impact, 1/8-inch (ft-lb/in) (gated) | 1.1 | 0.8 | 0.8 |
| Gardner Impact (in-lb/in) | 21 | 15 | 13 |
| DTUL, 1/8-inch, 264 psi (° C.) | 197 | 190 | 196 |
| Melt Flow Index (g/10 min) 250° C./2.16 kg | 7.5 | 8.4 | 13.8 |
| Electricals | | | |
| Dielectric Strength (KV/mil) | 0.415 | 0.400 | 0.390 |
| Dielectric Constant | 3.600 | 3.726 | 3.720 |
| Dissipation Factor | 0.0083 | 0.0026 | 0.0030 |
| Volume Resistivity (ohm-cm × $10^{15}$) | 5.4 | 3.4 | 3.5 |
| Surface Resistivity (ohm × $10^x$) | 1.5 × $10^{14}$ | 4.0 × $10^{12}$ | 4.5 × $10^{13}$ |
| CTI (volts @ 50 drops) | 150 | 188 | 138 |
| UV Stability | | | |
| Color L | 66.4 | 65.7 | 63.1 |
| Color a | −0.4 | 1.7 | 2.4 |
| Color b | 7.7 | 10.4 | 12.3 |
| Color YI | 20.4 | 30.5 | 38.1 |
| Gloss (60°) | 7.1 | 5.3 | 5.4 |
| ΔE 100 hr Xenon Arc | 2.3 | 10.7 | 9.3 |
| ΔE 200 hr Xenon Arc | 2.4 | 13.4 | 12.1 |
| ΔE 300 hr Xenon Arc | 2.1 | 15.1 | 13.6 |
| Properties After Heat Aging (180° C. for 1 wk) | | | |
| Color L | 24.6 | 28.6 | 26.8 |
| Color a | 4.4 | 4.1 | 4.2 |
| Color b | 2.4 | 3.7 | 2.7 |
| Color YI | 33.1 | 35.6 | 31.6 |
| ΔE | 42.4 | 37.8 | 37.6 |
| Tensile Yield (psi × $10^3$) | 11.0 | 10.0 | 9.9 |
| Tensile Modulus (psi × $10^5$) | 13.1 | 14.6 | 14.4 |
| Elongation (%) (Yield) (Break) | 0.9; 1.0 | 0.7; 0.7 | 0.7; 0.7 |
| CTI (volts @ 50 drops) | 150 | 125 | 125 |
| Bloom (4 weeks @ 80° C.) | none | none | none |

EXAMPLE 6

The excellent melt stability of the compositions of this invention was demonstrated by conducting capillary rheometry measurements on several PBT formulations. The formulations tested were (A) a control composed of 30% glass-filled PBT, with no other additive introduced therein; (B) a composition of this invention composed of 30% glass-filled PBT with which were blended 12.7 wt % HP-7010 and 5 wt % $Sb_2O_3$; and (C) a composition not of this invention composed of 30% glass-filled PBT with which were blended 12.1 wt % 68PB and 5 wt % $Sb_2O_3$. Each formulation was dried at 140° C. for 4 hours prior to testing. The testing was performed at a shear rate of 1075/sec at 250° C. The instrument used was a Rosand twin bore capillary rheometer with capillary dimensions of L:8 mm and 0.25 mm D: 0.5mm. The formulations were placed in the capillary rheometer barrel and preheated for 5 minutes. After the preheat time, shear viscosity measurements were taken at 0, 10, 20, and 30 minutes of residence time in the barrel of the capillary rheometer. The data was plotted on a graph of shear viscosity as a function of time. Linear regression was done on the data and a slope was determined. Degradation typically appears in the form of polymer molecular weight reduction, resulting in reduced melt viscosity. The slope represents the change in viscosity over time, and therefore the melt stability. The calculated slopes using this procedure were as follows:

(A) Control: −11.5

(B) The Invention: −8.8

(C) Not of the Invention −23.7

These results show that the composition of this invention (B) was essentially as stable as the control sample. On the other hand, the composition not of this invention exhibited a much poorer melt stability.

Examples 7, 8, and 9 illustrate additional procedures by which suitable brominated polystyrenes for use in the practice of this invention can be prepared.

EXAMPLE 7

A 0.910 g (6.82 mmol) portion of powdered aluminum chloride was suspended (stirred at 250 rpm) in 190 g of dry (13 ppm water) bromochloromethane (BCM) in 1-L jacketed flask cooled to 0° C. by circulating glycol bath. A 419.86 g portion of a 10.00 wt % solution of polystyrene (403.1/n mmol) in dry BCM was pumped at a constant rate of 8.46 g/min (8.13 mmol/min) to a jacketed, glycol-cooled mixing tee mounted on the reaction flask. At the same time, bromine was pumped at a constant rate of 6.09 g/min (38.1 mmol/min) to the same mixing tee where it combined with the polystyrene solution (feed mole ratio of $Br_2$/PS is 4.69) before dropping into the stirred catalyst suspension in the reaction flask. The bromine feed was stopped after 30.0 min (1143.5 mmol) and the polystyrene solution feed was stopped after 49.6 minutes (overall mole ratio of $Br_2$/PS is 2.84). A rinse of 160 g of dry BCM was used for the polystyrene solution feed system to assure complete transfer of the polymer to the reaction flask. The reaction temperature was maintained at 0° C.–5° C. throughout the addition and subsequent 2 hr cook period. The catalyst was deactivated by addition of 16.4 g of 10 wt % aqueous solution of sodium gluconate, and pH was adjusted to 14 by addition of 60.7 g of 10 wt % aqueous NaOH. The reaction mixture was washed with 10 wt % aqueous sodium sulfite followed by a water wash. The product was recovered from the organic phase by addition to vigorously stirred hot (90° C.) water containing 0.02 wt % dioctyl sulfosuccinate sodium salt surfactant. The solvent is distilled from the hot water leaving a slurry of the brominated polystyrene product in water. After filtering, the powdery solid was rinsed with water and dried to constant weight in a vacuum oven (150° C./2 torr/5 hr). The dry solid weighed 127.08 g (95% yield). The product contained 69.6 wt % total Br. In the thermal stability test referred to above, the product evolved 174 ppm of HBr in 15 minutes at 300° C. The HunterLab solution color (10 wt % in chlorobenzene) values were L=94.58, a=−2.79, b=17.29, Delta E=18.34.

EXAMPLE 8

A Y-shaped mixing apparatus having a cooling jacket was equipped with 2 feed lines, each connected to a pump. One of the feed lines was for delivering bromine and the other was for delivering a PS and BCM solution. Bromine (93.3 g, 31.3 mL or 0.583 mole), delivered at a rate of 1 mL/min (19.4 mmol/min), and a PS/BCM solution (22.4 g PS, 0.215 mol and 97 mL or 194 g of anhydrous BCM), delivered at 4 mL/min (7.17 mmol/min), were fed simultaneously from their respective feed lines into the cooled (5° C.) Y-mixing apparatus. The resultant intimate mixture from the mixing apparatus was then fed into a cooled (5° C.) suspension of 0.45 g (2 wt % based on PS) of powdered aluminum chloride in 49 mL (98 g) of anhydrous BCM. Evolved HBr was scrubbed by a caustic solution during the reaction. The feeds were complete in 35 minutes and the mixture was cooked for 2 hours at 5° C. After water and sodium sulfite washes, solid BrPS was isolated by precipitating from 500 mL of hot (90° C.) water as described above. A total of 66 g of BrPS (97% yield) was obtained. The product contained 68.4 wt % total Br. In the thermal stability test referred to above, the product evolved 71 ppm of HBr in 15 minutes at 300° C. The HunterLab solution color (10 wt % in chlorobenzene) values were L=96.74, a =−1.90, b=15.99, Delta E=16.44.

EXAMPLE 9

A 0.910 g (6.82 mmol) portion of powdered aluminum chloride is suspended (stirred at 250 rpm) in 190 g of dry (13 ppm water) bromochloromethane (BCM) in 1-L jacketed flask cooled to 0° C. by circulating glycol bath. A 419.86 g portion of a 10.00 wt % solution of polystyrene (403.1/n mmol) in dry BCM is pumped at a constant rate of 8.46 g/min (8.13 mmol/min) to a jacketed, glycol-cooled mixing tee mounted on the reaction flask. At the same time, bromine is pumped at a constant rate of 6.09 g/min (38.1 mmol/min) to the same mixing tee where it is combined with the polystyrene solution (feed mole ratio of $Br_2$/PS is 4.69) before dropping into the stirred catalyst suspension in the reaction flask. The bromine feed is stopped after 30.0 min (1143.5 mmol) and the polystyrene solution feed is stopped after 30 minutes (overall mole ratio of $Br_2$/PS is 2.84). A rinse of 160 g of dry BCM is used for the polystyrene solution feed system to assure complete transfer of the polymer to the reaction flask. The reaction temperature is maintained at 0° C.–5° C. throughout the addition and subsequent 45 minute cook period. The catalyst is deactivated by addition of 16.4 g of water. The crude organic and aqueous phases are allowed to settle, and the aqueous acidic phase is removed. Then the pH is adjusted to 14 by the addition of 10 wt % aqueous NaOH, and sodium borohydride is added to scavenge any excess bromine. The product is then recovered from the organic phase by addition to vigorously stirred hot (90° C.) water. The solvent is distilled from the hot water leaving a slurry of the brominated polystyrene product in water. After filtering, the powdery solid is rinsed with water and dried to constant weight in a vacuum oven (150° C./2 torr/5 hr).

Examples 10–23 illustrate additional preferred procedures for producing brominated polystyrenes well suited for use in forming compositions of this invention.

EXAMPLES 10–23

The following procedure was used in these Examples: A mixture of 1.44 g (10.8 mmol) of aluminum chloride (Aldrich, anhydrous) and 310 g of dry (10–60 ppm water after drying over molecular sieves) bromochloromethane (BCM) was stirred at 350 rpm with a paddle of Teflon® polymer in a 1-L three-necked jacketed round bottom flask. The flask contents were cooled to the desired temperature by circulating chilled ethylene glycol through the jacket. A 10 wt % solution of Dow Styron 612 polystyrene (72.2 g; 0.69 equivalents) in dry BCM (650 g) was charged to a separate vessel (500 mL graduated addition funnel). The polystyrene solution was pumped from the bottom of this feed reservoir to a vacuum jacketed mixing tee mounted on the reaction flask. The tee was maintained at the same temperature as the reaction mixture by circulating the ethylene glycol exiting from the flask to the tee. As the polystyrene solution was pumped from the reservoir, bromine (295.5 g; 1.85 mol) was simultaneously pumped from a 125-mL graduated addition funnel to the same mixing tee where it combined with the polystyrene solution. The resulting red solution flowed through the jacketed, spiral column (approximately 12" in length) and exited above the surface of the stirred catalyst suspension. Two Masterflex pumps were used for the feed to the mixing tee. The polystyrene system used an all Teflon line with a Cole-Palmer 77390 pump head. The bromine feed system used a combination of Teflon and Viton tubing with the latter being used with a Masterflex 7518-10 pump head. Both feeds ended in approximately 32–35 minutes. Constant attention to feed rates was necessary in order to achieve complete addition simultaneously. The overall mole ratio of $Br_2$/PS was 2.7. A rinse of 57 g of dry BCM was used for the polystyrene solution feed system to assure complete transfer of the polymer to the reaction flask. After the addition was complete, the reaction was stirred at temperature for 45 minutes while being swept with nitrogen and was then quenched by the addition of 13 g of a 10 wt % solution of sodium sulfite. During the quench the material was stirred at 450 rpm and was stirred at this rate for 5 minutes. The reaction color changed from red/brown to a cream (light tan) during the sulfite addition. The reaction was allowed to stand for 5 minutes and the phases were separated using a bottom valve on the reaction flask. After removing the aqueous phase from the reactor, the organic layer was returned to the reactor and the pH was adjusted to 14 with the use of 10 wt % aqueous NaOH (100–200 g). Additional BCM (267 g) was added, the mixture was transferred to a separatory funnel, and the phases were allowed to separate. Product was recovered from the organic phase by addition to hot water as follows. A 2-L three-necked creased flask equipped with a mechanical stirrer, 125 mL addition funnel, thermometer, and Dean-Stark trap with a condenser was charged with 700 mL of water and heated to 92–94° C. with a heating mantle. The addition funnel was filled with the contents from the bottom phase of the separatory funnel. The feed rate from the addition funnel was controlled so that the condenser on the Dean-Stark trap was not overloaded and so that the water temperature did not fall below 91° C. BCM and some water were removed overhead while the product precipitated in the water as white to yellowish-white solids. The addition funnel was refilled as necessary to have a continuous flow of material to the flask. After the addition was complete, the slurry was stirred at temperature for about 10 minutes to ensure complete removal of BCM. The slurry was allowed to cool to about 65° C. and collected on a Buchner funnel using suction filtration through #2 filter paper. About 300 mL of hot water was used to rinse the flask and the filter cake. The solids were transferred to a 2-L beaker, thoroughly mixed with 400 mL of water and reisolated by suction filtration. The solids were air dried overnight and then dried at 150° C. in a vacuum oven (1–5mm Hg) until a constant weight (180–200 g) was achieved. The product was powdered with a mortar and pestle prior to analysis (see Table IV).

TABLE IV

| ANALYTICAL RESULTS | | | | | | | |
|---|---|---|---|---|---|---|---|
| Example | 10 | 11 | 12 | 13 | 14 | 15 | 16 |
| Reaction Temp. (° C.) | −10 | −10 | −10 | −10 | 0.00 | 0.00 | 0.00 |
| Total Br (wt %) | 68.7 | 68.8 | 69.2 | 68.3 | 69.3 | 70.1 | 68.5 |
| Thermal Stability (ppm HBr) | 312 | 267 | 289 | 328 | 330 | 196 | 115 |
| Hunter Lab Soln. Color (10% PhCl) | | | | | | | |
| L | 98.09 | 97.64 | 97.74 | 97.75 | 97.14 | 97.51 | 96.79 |
| a | −1.70 | −1.83 | −1.51 | −1.54 | −2.12 | −1.59 | −2.33 |
| b | 7.98 | 8.56 | 7.55 | 8.10 | 9.78 | 7.90 | 11.08 |
| ΔE | 8.38 | 9.07 | 8.02 | 8.55 | 10.40 | 8.43 | 11.77 |
| TGA 1% Wt loss Temp/$N_2$ (° C.) | 351 | 353 | 358 | 353 | 355 | 356 | 347 |
| GPC mol. Wt. (light scat. detect.) | | | | | | | |
| $M_w$ (×$10^3$) | 595 | 601 | 580 | 631 | 634 | 572 | 645 |
| Calc'd $M_w$ (×$10^3$) | 591 | 592 | 600 | 584 | 602 | 617 | 587 |
| $M_w/M_w$ (Calc'd) | 1.01 | 1.02 | 0.97 | 1.08 | 1.05 | 0.93 | 1.10 |

TABLE IV-continued

| ANALYTICAL RESULTS | | | | | | | |
|---|---|---|---|---|---|---|---|
| Example | 17 | 18 | 19 | 20 | 21 | 22 | 23 |
| Reaction Temp. (° C.) | 0.00 | 10 | 10 | 10 | 20 | 20 | 20 |
| Total Br (wt %) | 68.6 | 69.0 | 69.1 | 68.9 | 69.2 | 68.7 | 68.7 |
| Thermal Stability (ppm HBr) | 74 | 222 | 203 | 194 | 349 | 313 | 249 |
| Hunter Lab Soln. Color (10% PhCl) | | | | | | | |
| L | 97.31 | 96.47 | 96.88 | 96.56 | 94.40 | 94.70 | 94.43 |
| a | −2.32 | −3.12 | −2.83 | −2.57 | −3.18 | −3.40 | −3.23 |
| b | 10.10 | 14.63 | 12.98 | 13.09 | 22.79 | 22.17 | 23.92 |
| Reaction Temp. (° C.) | 0.00 | 10 | 10 | 10 | 20 | 20 | 20 |
| ΔE | 10.71 | 15.38 | 13.65 | 13.77 | 23.68 | 23.05 | 24.78 |
| TGA 1% Wt loss Temp/$N_2$ (° C.) | 351 | 352 | 347 | 349 | 342 | 347 | 344 |
| GPC mol. Wt. (light scat. detect.) | | | | | | | |
| $M_w$ (×$10^3$) | 583 | 673 | 694 | 819 | 886 | 863 | 831 |
| Calc'd $M_w$ (×$10^3$) | 589 | 596 | 598 | 594 | 600 | 591 | 591 |
| $M_w/M_w$ (Calc'd) | 0.99 | 1.13 | 1.16 | 1.38 | 1.48 | 1.46 | 1.41 |

Commonly-owned application Ser. No. 09/066,172, filed Apr. 24, 1998, describes processes in which a suitable amount of aqueous base is employed to improve the thermal stability of the resultant brominated polystyrene. It is to be noted that the use of such processes, while desirable, is not required pursuant to this invention, as the excellent results referred to hereinabove were achieved without using brominated polystyrene formed in this way. Thus, the process procedures which are fully described in this commonly-owned copending application, constitute optional, but entirely suitable procedures for producing brominated polystyrene for use in forming the compositions of the present invention.

Inclusion of the suitable amount of inorganic alkali metal base such as NaOH or KOH into the brominated polystyrenes of Examples 10–23 is preferably accomplished substantially in the manner described in Example 24, infra, by utilizing a suitable excess of aqueous NaOH (or KOH) when precipitating the brominated polystyrene from BCM, and either eliminating the final water wash step or substituting an aqueous NaOH (or KOFI) solution as the final wash. Alternatively, and less preferably, brominated polystyrenes formed as described in Examples 10–23 in finely-divided or powder form can be powder blended with suitable quantities of powdered alkali metal base such as sodium hydroxide, sodium acetate, or potassium hydroxide.

EXAMPLE 24

The procedure of Example 1 is repeated and in the step wherein the reaction mixture is washed with water and neutralized with a mixture of aqueous sodium gluconate, sodium sulfite, and sodium hydroxide, the amount of the aqueous sodium hydroxide is such that a dried sample of the brominated polystyrene composition produced in the process, when subjected to the following pH determination procedure, gives an aqueous extract having a pH of 9.3. The procedure for determining pH of the brominated polystyrene composition is as follows: Place in a beaker 1 gram to 1.5 grams of a representative sample, weighed to the nearest 0.1 gram, and dissolve same in 50 mL of BCM. Then add 50 mL of water which has been boiled to remove carbon dioxide and has a pH of 7. Vigorously stir the resultant mixture with a magnetic stirrer such that the two liquid phases are intimately mixed for 2 to 5 minutes. Then reduce the stirrer speed such that the two phases separate in the beaker, and lower the pH electrode in the upper layer only. Measure the pH of the upper layer using a Hach EC-10 pH meter (or equivalent) that has been calibrated the same day.

Particularly preferred brominated styrenic polymers for use in the practice of this invention have an ionic bromine content of 2000 ppm or less, preferably 1500 ppm or less, more preferably 1000 ppm or less, and most preferably 500 ppm or less, all such ppm levels being based on the total weight of the brominated styrenic polymer. Polymers of this type are described in detail in commonly-owned copending application Ser. No. 09/151,193, filed on the same date as this application.

A preferred process can be used to ensure recovery of a purified brominated polystyrene polymer (or other brominated styrenic polymer) having a suitably low ionic halogen content (e.g., ionic bromine or ionic chlorine content) from the reaction mass formed by brominating polystyrene with bromine in a halocarbon or halohydrocarbon solvent having a boiling point below 100° C. and in the presence of a Lewis acid catalyst. Such preferred process comprises:

a) quenching the reaction mass in water to form an aqueous phase and an organic phase, and recovering the organic phase;

b) mixing the organic phase with water at a temperature in the range of about 10 to about 100° C. in a ratio of from about 0.02 to about 0.6 part by volume of the aqueous phase per each 1 part by volume of organic phase to form an aqueous extraction phase and an extracted organic phase, and recovering the extracted organic phase;

c) optionally but preferably, mixing inorganic alkali metal base and water with extracted organic phase from b) to form an alkaline mixture in which the pH of the aqueous phase in this mixture is in the range of about 7 to 14, and preferably in the range of about 10 to 14;

d) mixing a bromine scavenger and water with alkaline mixture from c) to form a bromine scavenged mixture;

e) precipitating brominated polystyrene by mixing bromine scavenged mixture from d) with a water solution of inorganic alkali metal base maintained at or above the boiling temperature of the halocarbon or halohydrocarbon solvent; and f) recovering brominated polystyrene formed as a precipitate in e).

Before proceeding to step c) above, step b) above can be repeated one or more times as may be necessary or appropriate in achieving the desired reduction in ionic halogen (e.g., ionic bromine). Alternatively, step b) can be conducted on a continuous basis using liquid—liquid extraction apparatus such as a liquid—liquid extraction tower. Sodium sulfite and sodium borohydride are the preferred bromine scavengers for use in step d) above. However, other water-soluble inorganic sulfides such as lithium sulfite, potassium sulfite, magnesium sulfite, ammonium sulfite, etc., or other water soluble borohydrides such as lithium borohydride, potassium borohydride, etc., can be used. And in step d) above, a coalescing filter can be employed, if desired, to remove additional aqueous phase from the organic phase, and thereby still further reduce the ionic halogen content of the finished product.

The following Example 25 illustrates the manner by which such purification process can be conducted.

EXAMPLE 25

A brominated polystyrene reaction mass (1500 parts), formed by reacting bromine with a 10 wt % solution of polystyrene in bromochloromethane (BCM) using aluminum chloride as catalyst, was quenched in 450 parts of water, and thoroughly mixed for 15 minutes. A sample of the quenched reaction mass (Sample A) was taken for use in the purification process described below. The aqueous and organic phases were allowed to settle and the aqueous phase was removed by decantation. The organic phase was then brought to pH 12 by the addition of 50 parts of fresh water and 25 parts of 25 wt % sodium hydroxide solution. This mixture was thoroughly mixed. Any residual bromine was scavenged by addition to the mixture of 1.7 parts of 6.9 wt % sodium borohydride in 23 wt % aqueous sodium hydroxide solution, followed by thorough mixing. A sample of the resultant organic phase (Sample B) was taken for recovery of the brominated polystyrene without use of the following purification process.

Application of the purification process to Sample A was performed as follows: Sample A, was poured into a 1000 mL glass separatory funnel. The aqueous and organic phases were allowed to separate for 5 minutes. The organic phase was removed from the bottom of the funnel (325.2 grams). The aqueous layer was recovered (71.0 grams). The organic phase was separated into two equal halves and placed into two 8-ounce jars. Fresh water was placed into each jar for a second water wash (46.1 grams). This water level is equivalent to a ratio of 850 parts of water to 1500 parts of reaction mass. Both jars were shaken for 30 minutes on a Burrell Wrist Action Shaker. The contents of both jars were poured into and combined in a 1000 mL separatory funnel and allowed to separate for 5 minutes. The organic phase was recovered from the bottom (319.5 grams), and 95.3 grams of aqueous phase remained in the funnel. Fresh water (12.8 grams) was added to the organic phase to assist in pH reading using strips of pH indicator paper. The pH of the organic phase was 5. The pH was raised to 14 by the addition of 25% by weight aqueous sodium hydroxide solution (2.4 grams). Excess bromine was scavenged by the addition of 6.9 wt % sodium borohydride in 23 wt % aqueous sodium hydroxide solution (0.5 gram). The brominated styrene product from Sample A was recovered by precipitation into a mixture formed from 1500 grams of water and 12.6 grams of 25% by weight aqueous sodium hydroxide solution. In conducting this precipitation operation, the water-sodium hydroxide mixture was in a 3000 mL glass reactor, with baffles, and was heated to 100° C. The vessel was stirred by an agitator set on 500 rpm. The organic phase was fed into this reactor by a peristaltic pump, set on 42 rpm through ⅛" polypropylene tubing into the water. The feed point was approximately ½" underneath the water surface. The BCM was condensed and removed overhead. After the organic phase was fed, the water temperature was allowed to return to 100° C. to remove any residual BCM and then cool. The brominated polystyrene product was vacuum filtered in a 2000 mL fitted glass filter. It was washed three times with approximately 1000 mL of warm water. The solids were dried in a vacuum oven at 140° C. overnight. The ionic bromine level detected in the final brominated polystyrene product from Sample A was 222 ppm.

The brominated polystyrene product from Sample B, without use of the above purification process, was recovered by use of the foregoing precipitation procedure. The precipitation used 1500 grams of water and 13.0 grams of 25% by weight sodium hydroxide aqueous solution. The ionic bromine level detected in the final brominated polystyrene product recovered from Sample B was 1810 ppm.

It is to be understood that the components referred to by chemical name or formula anywhere in the specification or claims hereof, whether referred to in the singular or plural, are identified as they exist prior to coming into contact with another substance referred to by chemical name or chemical type (e.g., another component, a solvent, or, etc.). It matters not what preliminary chemical changes, transformations and/or reactions, if any, take place in the resulting mixture or solution as such changes, transformations, and/or reactions are the natural result of bringing the specified components together under the conditions called for pursuant to this disclosure. Thus, the components are identified as ingredients to be brought together in connection with performing a desired operation or in forming a desired composition. Even though the claims hereinafter may refer to substances, components and/or ingredients in the present tense ("comprises," "is," etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with the application of common sense and the ordinary skill of a chemist, is, thus, wholly immaterial for an accurate understanding and appreciation of the true meaning and substance of this disclosure and the claims thereof.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. A composition which comprises a polyalkylene terephthalate polymer having intimately mixed therein, a flame retardant amount of brominated styrenic polymer which, prior to mixing, contains less than about 700 ppm Cl and has a TGA temperature for 1% weight loss which is 340° C. or higher.

2. A composition of claim 1 further comprising a reinforcing amount of glass fiber dispersed therein.

3. A composition of claim 1 further comprising a flame retardant synergist dispersed therein.

4. A composition of claim 1 wherein said polyalkylene terephthalate polymer consists essentially of polybutylene terephthalate.

5. A composition of claim 1 wherein said polyalkylene terephthalate polymer consists essentially of polyethylene terephthalate.

6. A composition of claim 1 wherein said TGA temperature is within the range of from about 340° C. to about 380° C.

7. A composition of claim 1 wherein said TGA temperature is within the range of from about 345° C. to about 380° C.

8. A composition of claim I wherein said brominated styrenic polymer has an actual $M_w$ which is within about 20% of its calculated theoretical $M_w$, the theoretical $M_w$ being based upon the actual bromine content of the brominated polystyrene and the $M_w$ of the polystyrene reactant used to produce the brominated polystyrene.

9. A composition of claim 8 wherein said actual $M_w$ is within about 10% of the theoretical $M_w$.

10. A composition of claim 8 wherein said brominated styrenic polymer is essentially free of impurities selected from the group consisting of ethylene dichloride, bromodichloroethane, dibromochloroethane, dibromodichloroethane, tribromochloroethane and any mixture of two or more of the foregoing.

11. A composition of claim 1 further comprising glass fiber reinforcement in an amount of up to about 50 wt % substantially uniformly dispersed in said composition, the foregoing percentage being based on the total weight of said composition.

12. A composition of claim 1 further comprising a flame retardant synergist in an amount of up to about 12 wt % substantially uniformly dispersed in said composition, the foregoing percentage being based on the total weight of said composition.

13. A composition of claim 1 further comprising (i) glass fiber reinforcement in an amount of up to about 50 wt % substantially uniformly dispersed in said composition, and (ii) a flame retardant synergist in an amount of up to about 12 wt % substantially uniformly dispersed in said composition, the foregoing percentages being based on the total weight of said composition.

14. A composition of claim 13 wherein said polyalkylene terephthalate polymer consists essentially of polybutylene terephthalate.

15. A composition of claim 14 wherein said composition has a comparative tracking index of at least about 240 volts at 50 drops.

16. A composition of claim 14 wherein said composition has a comparative tracking index of at least about 280 volts at 50 drops.

17. A composition of claim 14 wherein said composition has a UL-94 rating of V-O using both 1/16-inch test specimens and 1/32-inch test specimens.

18. A composition of claim 14 wherein said composition has a comparative tracking index of at least about 280 volts at 50 drops and a UL-94 rating of V-O using both 1/16-inch test specimens and 1/32-inch test specimens.

19. A composition of claim 14 wherein said composition has a melt stability
   a) as determined by capillary rheometry performed at a shear rate of 1075/sec at 250° C. in a Rosand twin bore capillary rheometer with capillary dimensions of L:8 mm and 0.25 mm D: 0.5 mm, and
   b) wherein shear viscosity measurements are taken on said composition at 0, 10, 20, and 30 minutes of residence time in the barrel of the capillary rheometer and plotted as a function of time, that provides a slope using linear regression that is within about 15 degrees of the slope derived in the same manner from a control composition that (i) is made from the same ingredients in the same proportions except that it is devoid of the brominated polystyrene, and (ii) is tested in the same way under the same test conditions.

20. A composition of claim 14 wherein said composition has:
   A) a UL-94 rating of V-O using both 1/16-inch test specimens and 1/32-inch test specimens;
   B) a comparative tracking index of at least about 240 volts at 50 drops; and
   C) a melt stability
      1) as determined by capillary rheometry performed at a shear rate of 1075/sec at 250° C. in a Rosand twin bore capillary rheometer with capillary dimensions of L:8 mm and 0.25 mm D: 0.5 mm, and
      2) wherein shear viscosity measurements are taken on said composition at 0, 10, 20, and 30 minutes of residence time in the barrel of the capillary rheometer and plotted as a function of time, that provides a slope using linear regression that is within about 15 degrees of the slope derived in the same manner from a control composition that (i) is made from the same ingredients in the same proportions except that it is devoid of the brominated polystyrene, and (ii) is tested in the same way under the same test conditions.

21. A composition of claim 20 wherein said composition has a comparative tracking index of at least about 280 volts at 50 drops.

22. A composition of claim 13 wherein said polyalkylene terephthalate polymer consists essentially of polyethylene terephthalate.

23. A composition of claim 22 wherein said composition has a comparative tracking index of at least about 150 volts at 50 drops.

24. A composition of claim 22 wherein said composition has a comparative tracking index of at least about 180 volts at 50 drops.

25. A composition of claim 22 wherein said composition has a UL-94 rating of V-O using both 1/16-inch test specimens and 1/32-inch test specimens.

26. A composition of claim 22 wherein said composition has a UL-94 rating of V-O using both 1/16-inch test specimens and 1/32-inch test specimens, and a comparative tracking index of at least about 150 volts at 50 drops.

27. A composition of claim 22 wherein said composition has a UL-94 rating of V-O using both 1/16-inch test specimens and 1/32-inch test specimens, and a comparative tracking index of at least about 180 volts at 50 drops.

28. A molded or extruded shape or object formed from a composition of any of claims 1, 2, 3, 8, 10, 11, 12, 13, 18, 20, 22, 24, 25, or 26.

* * * * *